United States Patent
Ochi et al.

(10) Patent No.: US 11,472,899 B2
(45) Date of Patent: Oct. 18, 2022

(54) ETHYLENE-α-OLEFIN COPOLYMER, METHOD OF PRODUCING ETHYLENE-α-OLEFIN COPOLYMER, ETHYLENE-BASED RESIN COMPOSITION, AND FILM

(71) Applicant: SUMITOMO CHEMICAL COMPANY, LIMITED, Tokyo (JP)

(72) Inventors: Naoko Ochi, Ichihara (JP); Risa Murata, Ichihara (JP); Yuki Azuma, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 142 days.

(21) Appl. No.: 17/061,501

(22) Filed: Oct. 1, 2020

(65) Prior Publication Data
US 2021/0122854 A1    Apr. 29, 2021

(30) Foreign Application Priority Data

Oct. 28, 2019   (JP) .............................. JP2019-195192
Jun. 15, 2020   (JP) .............................. JP2020-103129

(51) Int. Cl.
| | | |
|---|---|---|
| *C08F 210/16* | (2006.01) | |
| *C08L 23/16* | (2006.01) | |
| *C08F 210/02* | (2006.01) | |
| *C08L 23/08* | (2006.01) | |

(52) U.S. Cl.
CPC .......... *C08F 210/02* (2013.01); *C08F 210/16* (2013.01); *C08F 2410/01* (2013.01); *C08F 2800/10* (2013.01); *C08L 23/0815* (2013.01); *C08L 23/16* (2013.01)

(58) Field of Classification Search
None
See application file for complete search history.

(56) References Cited

U.S. PATENT DOCUMENTS

| | | |
|---|---|---|
| 2006/0177675 A1 | 8/2006 | Lehtinen et al. |
| 2017/0101490 A1 | 4/2017 | Ishihama et al. |
| 2019/0382515 A1 | 12/2019 | Ochi et al. |

FOREIGN PATENT DOCUMENTS

| | | |
|---|---|---|
| EP | 2 935 367 A1 | 10/2015 |
| JP | H06-009724 A | 1/1994 |
| JP | 2000-044739 A | 2/2000 |
| JP | 2004-256613 A | 9/2004 |
| JP | 2008-106264 A | 5/2008 |
| JP | 2016-518507 A | 6/2016 |
| WO | WO-2014/099307 A1 | 6/2014 |
| WO | WO-2014/186272 A1 | 11/2014 |
| WO | WO-2015/152266 A1 | 10/2015 |
| WO | WO-2018/164169 A | 9/2018 |
| WO | WO-2019/108977 A1 | 6/2019 |

OTHER PUBLICATIONS

Extended European Search Report dated Apr. 8, 2021 for corresponding European Patent Application No. 20198285.7.

*Primary Examiner* — Richard A Huhn
(74) *Attorney, Agent, or Firm* — Foley & Lardner LLP

(57) ABSTRACT

An ethylene-α-olefin copolymer capable of implementing formation of a film having excellent slipperiness and suppressed fish eyes, a method of producing the ethylene-α-olefin copolymer, an ethylene-based resin composition containing the ethylene-α-olefin copolymer, and a film containing the ethylene-α-olefin copolymer or the ethylene-based resin composition. An ethylene-α-olefin copolymer according to the present invention has: a monomer unit (1) based on ethylene; and a monomer unit (2) based on an α-olefin having 3 to 20 carbon atoms, wherein a branching parameter is 0.70 to 0.90, and a light scattering area ratio is 1.60 to 3.60.

12 Claims, No Drawings

ETHYLENE-α-OLEFIN COPOLYMER, METHOD OF PRODUCING ETHYLENE-α-OLEFIN COPOLYMER, ETHYLENE-BASED RESIN COMPOSITION, AND FILM

BACKGROUND OF THE INVENTION

Field of the Invention

The present invention relates to an ethylene-α-olefin copolymer, a method of producing the ethylene-α-olefin copolymer, an ethylene-based resin composition containing the ethylene-α-olefin copolymer, and a film containing the ethylene-α-olefin copolymer or the ethylene-based resin composition.

Description of the Related Art

A laminated film obtained by stacking (laminating) a base film and a sealant film has been widely used as a film for packing foods, detergents, or the like. The sealant film is required to have excellent heat sealability, transparency, and strength. As the sealant film having such properties, a film containing an ethylene-α-olefin copolymer has been recently proposed (for example, JP-A-2004-256613 and JP-A-2000-44739).

When a laminated film is produced by using a sealant film, the sealant film is further required to have excellent slipperiness. As a film having excellent slipperiness, for example, WO 2018/164169 A discloses a film containing an ethylene-α-olefin copolymer, the ethylene-α-olefin copolymer having a monomer unit based on ethylene and a monomer unit based on an α-olefin having 3 to 20 carbon atoms, a density of 915 kg/m$^3$ to 950 kg/m$^3$, a melt flow rate of 0.0001 g/10 min to 0.2 g/10 min under conditions of a temperature of 190° C. and a load of 21.18 N, and a zero shear viscosity of 1×10$^5$ Pa·sec to 1×10$^7$ Pa·sec at a temperature of 190° C.

SUMMARY OF THE INVENTION

However, the film described in WO 2018/164169 A has excellent slipperiness, but has a deteriorated appearance due to a lot of fish eyes (film defect).

An object of the present invention is to provide an ethylene-α-olefin copolymer capable of implementing formation of a film having excellent slipperiness and suppressed fish eyes, a method of producing the ethylene-α-olefin copolymer, an ethylene-based resin composition containing the ethylene-α-olefin copolymer, and a film containing the ethylene-α-olefin copolymer or the ethylene-based resin composition.

According to the present invention, an ethylene-α-olefin copolymer has: a monomer unit (1) based on ethylene; and a monomer unit (2) based on an α-olefin having 3 to 20 carbon atoms, wherein a branching parameter represented by the following Equation (i) is 0.70 to 0.90, and a light scattering area ratio represented by the following Equation (ii) is 1.60 to 3.60,

[Math. 1]

$$\text{Branching parameter} = \frac{\sum_{M=10^{4.3}}^{10^{5.5}} W_M \times g'_M}{\sum_{M=10^{4.3}}^{10^{5.5}} W_M} \quad (i)$$

wherein M represents an absolute molecular weight of the ethylene-α-olefin copolymer, $W_M$ represents a weight fraction of the ethylene-α-olefin copolymer in the absolute molecular weight M, and $g'_M$ represents an intrinsic viscosity ratio of the ethylene-α-olefin copolymer in the absolute molecular weight M, and

[Math. 2]

$$\text{Light scattering area ratio} = \frac{LS}{LS'} \quad (ii)$$

wherein LS represents a light scattering area of a solution obtained by dissolving the ethylene-α-olefin copolymer in ortho-dichlorobenzene at a concentration of 2 mg/mL, and LS' represents a light scattering area of a solution obtained by dissolving NIST Standard Reference Material Linear polyethylene 1475a in ortho-dichlorobenzene at a concentration of 2 mg/mL.

According to the present invention, there is provided a method of producing an ethylene-α-olefin copolymer having a monomer unit (1) based on ethylene and a monomer unit (2) based on an α-olefin having 3 to 20 carbon atoms, the method including the following steps (a) to (c) of:

(a) pre-polymerizing ethylene and an α-olefin having 3 to 20 carbon atoms in the presence of a catalyst component obtained by bringing a metallocene-based complex, an organoaluminum compound, and a co-catalyst support into contact with each other to obtain a pre-polymerized catalyst component;

(b) bringing an organoaluminum compound into contact with oxygen gas and then into contact with an electron donating compound to obtain a coordination compound; and (c) performing gas phase polymerization on ethylene and an α-olefin having 3 to 20 carbon atoms in the presence of a polymerization catalyst obtained by bringing the pre-polymerized catalyst component and the coordination compound into contact with each other to obtain an ethylene-α-olefin copolymer.

According to the present invention, an ethylene-based resin composition contains: the ethylene-α-olefin copolymer; and an ethylene-based polymer having a monomer unit based on ethylene (different from the ethylene-α-olefin copolymer).

According to the present invention, a film contains the ethylene-α-olefin copolymer or the ethylene-based resin composition.

According to the present invention, it is possible to provide an ethylene-α-olefin copolymer capable of implementing formation of a film having excellent slipperiness and suppressed fish eyes, a method of producing the ethylene-α-olefin copolymer, an ethylene-based resin composition containing the ethylene-α-olefin copolymer, and a film containing the ethylene-α-olefin copolymer or the ethylene-based resin composition.

DETAILED DESCRIPTION OF THE PREFERRED EMBODIMENTS

Hereinafter, embodiments of the present invention will be described, but the present invention is not limited to the following embodiments.

Definition

Herein, the following terms are defined or explained as follows.

The term "ethylene-α-olefin copolymer" refers to a copolymer having a monomer unit based on ethylene and a monomer unit based on an α-olefin, and refers to a copolymer in which a total content of a monomer unit based on ethylene and a monomer unit based on an α-olefin is 95% by mass or more when a total mass of the copolymer is 100% by mass.

The term "ethylene-based polymer" refers to a polymer having a monomer unit based on ethylene, and refers to a polymer in which a content of a monomer unit based on ethylene is 50% by mass or more when a total mass of the polymer is 100% by mass.

The term "α-olefin" refers to a linear or branched olefin having a carbon-carbon unsaturated double bond at the α position.

The term "ethylene-based resin composition" refers to a composition containing an ethylene-based polymer.

Herein, a melt flow rate (hereinafter, also referred to as an MFR) refers to a value (unit: g/10 min) measured under conditions of a temperature of 190° C. and a load of 21.18 N according to the method A defined in JIS K7210-1995.

Herein, a density refers to a value (unit: kg/m$^3$) measured according to the method A defined in JIS K7112-1980 after performing annealing described in JIS K6760-1995.

Ethylene-α-Olefin Copolymer

An ethylene-α-olefin copolymer (hereinafter, also referred to as a component (A)) according to the present embodiment has a monomer unit (1) based on ethylene and a monomer unit (2) based on an α-olefin having 3 to 20 carbon atoms. The monomer unit (2) is preferably a monomer unit based on an α-olefin having 4 to 8 carbon atoms.

Examples of the α-olefin having 3 to 20 carbon atoms can include propylene, 1-butene, 1-pentene, 1-hexene, 1-heptene, 1-octene, 1-nonene, 1-decene, 1-dodecene, 4-methyl-1-pentene, and 4-methyl-1-hexene. Among them, the α-olefin having 3 to 20 carbon atoms is preferably 1-hexene, 4-methyl-1-pentene, or 1-octene, and more preferably 1-hexene or 1-octene. The monomer units (2) based on the α-olefin having 3 to 20 carbon atoms may be used alone or in combination of two or more thereof.

When a total mass of the component (A) is 100% by mass, a content of the monomer unit (1) is preferably 90% by mass or more, and preferably 97% by mass or less. In addition, when the total mass of the component (A) is 100% by mass, a content of the monomer unit (2) is preferably 3% by mass or more, and preferably 10% by mass or less. In one embodiment, when the total mass of the component (A) is 100% by mass, the content of the monomer unit (1) is 90% by mass or more, and the content of the monomer unit (2) is 10% by mass or less.

Examples of the component (A) can include an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, an ethylene-1-hexene-1-octene copolymer, and an ethylene-1-butene-1-octene copolymer. Among them, the component (A) is preferably an ethylene-1-hexene copolymer, an ethylene-1-octene copolymer, an ethylene-1-butene-1-hexene copolymer, or an ethylene-1-butene-1-octene copolymer, and more preferably an ethylene-1-hexene copolymer or an ethylene-1-butene-1-hexene copolymer.

The component (A) may have another monomer unit based on a monomer other than ethylene and an α-olefin having 3 to 20 carbon atoms. Examples of the other monomer can include a conjugated diene such as butadiene or isoprene; a non-conjugated diene such as 1,4-pentadiene; acrylic acid; acrylic acid ester such as methyl acrylate or ethyl acrylate; methacrylate; methacrylic acid ester such as methyl methacrylate or ethyl methacrylate; and vinyl acetate.

A branching parameter of the component (A) represented by the following Equation (i) is 0.70 to 0.90, and preferably 0.70 to 0.80.

[Math. 3]

$$\text{Branching parameter} = \frac{\sum_{M=10^{4.3}}^{10^{5.5}} W_M \times g'_M}{\sum_{M=10^{4.3}}^{10^{5.5}} W_M} \quad (i)$$

Wherein M represents an absolute molecular weight of the ethylene-α-olefin copolymer, $W_M$ represents a weight fraction of the ethylene-α-olefin copolymer in the absolute molecular weight M, and $g'_M$ represents an intrinsic viscosity ratio of the ethylene-α-olefin copolymer in the absolute molecular weight M.

It should be noted that the weight fraction $W_M$ and the intrinsic viscosity ratio $g'_M$ of the ethylene-α-olefin copolymer in the absolute molecular weight M are measured in a range in which the absolute molecular weight M of the ethylene-α-olefin copolymer is $10^{4.3}$ to $10^{5.5}$.

The intrinsic viscosity ratio $g'_M$ can be calculated by using the following Equation (iii).

$$g'_M = [\eta]_M / (6.31 \times 10^{-4} \times M^{0.69}) \quad (iii)$$

Wherein M represents an absolute molecular weight of the ethylene-α-olefin copolymer, and $[\eta]_M$ represents an intrinsic viscosity of the ethylene-α-olefin copolymer in the absolute molecular weight M.

It should be noted that, in Equation (iii), the value of $(6.31 \times 10^{-4} \times M^{0.69})$ can be calculated assuming that the absolute molecular weight M of the ethylene-α-olefin copolymer is the same as that of NIST Standard Reference Material Linear polyethylene 1475a. That is, the value of $(6.31 \times 10^{-4} \times M^{0.69})$ corresponds to an intrinsic viscosity of the NIST Standard Reference Material Linear polyethylene 1475a in the absolute molecular weight M.

In Equations (i) and (iii), the absolute molecular weight M of the ethylene-α-olefin copolymer, the weight fraction $W_M$ of the ethylene-α-olefin copolymer in the absolute molecular weight M, and the intrinsic viscosity $[\eta]_M$ of the ethylene-α-olefin copolymer in the absolute molecular weight M can be measured using a gel permeation chromatography (GPC) apparatus equipped with a differential refractive index detector, a viscosity detector, and a light scattering detector.

The GPC measurement is performed under the following conditions.

GPC apparatus: HLC-8121GPC/HT (manufactured by Tosoh Corporation)
Light scattering detector: PD2040 (manufactured by Precision Detectors Inc.)
Laser light source: wavelength 685 nm
Viscosity detector: H502 (manufactured by Viscotek Corporation)
GPC column: three GMHHR-H(S) HTs (manufactured by Tosoh Corporation)
Concentration of sample solution: 2 mg/mL
Injection amount: 300 μL
Measurement temperature: 140° C.
Dissolution condition: stirring at 145° C. for 2 hours
Solvent and mobile phase: ortho-dichlorobenzene containing 0.05% by mass of dibutyl hydroxytoluene (Wako Pure Chemical Industries, special grade)
Mobile phase flow rate: 1.0 mL/min
Measurement time: about 1 hour
Molecular weight standard material: standard polystyrene
Data reading interval: 1.74 sec In a method of producing an ethylene-α-olefin copolymer to be described below, the branching parameter can be adjusted in a range of 0.70 to 0.90, for example, by a method in which ethylenebis(indenyl)zirconium diphenoxide is used as a catalyst component, a support obtained by supporting a zinc compound on a particulate support is used as a co-catalyst support, the used amount of oxygen gas to be brought into contact with an organoaluminum compound is 1 to 100 mol % with respect to the number of moles of an aluminum atom of the organoaluminum compound, triisobutylaluminum is used as the organoaluminum compound, the used amount of electron donating compound is 1 to 50 mol % with respect to the number of moles of the aluminum atom of the organoaluminum compound, and a polymerization pressure is 1 to 3 MPa.

A light scattering area ratio of the component (A) represented by the following Equation (ii) is 1.60 to 3.60, and preferably 2.70 to 3.00.

[Math. 4]

$$\text{Light scattering area ratio} = \frac{LS}{LS'} \quad \text{(ii)}$$

Wherein LS represents a light scattering area of a solution obtained by dissolving the ethylene-α-olefin copolymer in ortho-dichlorobenzene at a concentration of 2 mg/mL, and LS' represents a light scattering area of a solution obtained by dissolving NIST Standard Reference Material Linear polyethylene 1475a in ortho-dichlorobenzene at a concentration of 2 mg/mL.

In Equation (ii), the light scattering areas LS and LS' can be measured using a liquid chromatography (LC) apparatus equipped with a light scattering detector.

The LC measurement is performed under the following conditions.

LC apparatus: HLC-8121GPC/HT (manufactured by Tosoh Corporation)
Separation column: none
Measurement temperature: 140° C.
Solvent and mobile phase: ortho-dichlorobenzene containing 0.05% by mass of dibutyl hydroxytoluene (Wako Pure Chemical Industries, special grade)
Mobile phase flow rate: 1.0 mL/min
Concentration of sample solution: 2 mg/mL
Injection amount: 300 μL Molecular weight standard material: standard polystyrene
Data reading interval: 1.74 sec In a method of producing an ethylene-α-olefin copolymer to be described below, the light scattering area ratio can be adjusted in a range of 1.60 to 3.60, for example, by a method in which the used amount of oxygen gas to be brought into contact with an organoaluminum compound is 1 to 100 mol % with respect to the number of moles of an aluminum atom of the organoaluminum compound, triisobutylaluminum is used as the organoaluminum compound, an electron donating compound is brought into contact with a mixed contact material of organoaluminum and oxygen, the used amount of electron donating compound is 1 to 50 mol % with respect to the number of moles of the aluminum atom of the organoaluminum compound, and a ratio of hydrogen to ethylene during gas phase polymerization is 0.15% to 0.40%.

The melt flow rate (MFR) of the component (A) measured under conditions of a temperature of 190° C. and a load of 21.18 N is preferably 0.010 g/10 min or more, more preferably 0.020 g/10 min or more, and still more preferably 0.030 g/10 min or more, from the viewpoint of reducing an extrusion load during film formation. In addition, the MFR of the component (A) is preferably 0.2 g/10 min or less, more preferably 0.015 g/10 min or less, and still more preferably 0.013 g/10 min or less, from the viewpoint of improving slipperiness of a film. In one embodiment, the MFR of the component (A) is 0.010 g/10 min to 0.2 g/10 min. In the measurement of the MFR of the component (A), a sample obtained by mixing about 1,000 ppm of an anti-oxidant with the component (A) is generally used. In a method of producing an ethylene-α-olefin copolymer to be described below, the MFR can be adjusted in a range of 0.010 g/10 min to 0.2 g/10 min by adjusting a concentration of a chain transfer agent during gas phase polymerization.

The density of the component (A) is preferably 910 kg/m$^3$ or more, more preferably 918 kg/m$^3$ or more, and still more preferably 922 kg/m$^3$ or more, from the viewpoint of improving slipperiness of a film. In addition, the density of the component (A) is preferably 940 kg/m$^3$ or less, more preferably 935 kg/m$^3$ or less, and still more preferably 930 kg/m$^3$ or less, from the viewpoint of suppressing fish eyes in a film. In one embodiment, the density of the component (A) is 910 kg/m$^3$ to 940 kg/m$^3$. In a method of producing an ethylene-α-olefin copolymer to be described below, the density can be adjusted in a range of 910 kg/m$^3$ to 940 kg/m$^3$ by adjusting a concentration of the α-olefin during gas phase polymerization.

A ratio (hereinafter, denoted by Mz/Mw) of a z average molecular weight (hereinafter, also referred to as Mz) of the component (A) to a weight average molecular weight (hereinafter, also referred to as Mw) of the component (A) is preferably 2.0 or more, more preferably 2.1 or more, and still more preferably 2.2 or more, from the viewpoint of improving slipperiness of a film. In addition, Mz/Mw of the component (A) is preferably 5.0 or less, more preferably 4.0 or less, and still more preferably 3.0 or less, from the viewpoint of suppressing fish eyes in a film. In one embodiment, Mz/Mw of the component (A) is 2.0 to 5.0, in another embodiment, Mz/Mw of the component (A) is 2.1 to 4.0, and in still another embodiment, Mz/Mw of the component (A) is 2.2 to 3.0. Mz/Mw can be controlled by adjusting the used amount of electron donating compound with respect to the used amount of organoaluminum compound during gas phase polymerization. Specifically, Mz/Mw can be controlled to 2.0 to 5.0 by adjusting the used amount of electron donating compound with respect to the used amount of organoaluminum compound to 6% to 12% as a molar ratio.

The weight average molecular weight (Mw) and the z average molecular weight (Mz) can be measured using a gel permeation chromatography (GPC) apparatus equipped with a differential refractive index detector. The GPC measurement is performed under the following conditions.

GPC apparatus: HLC-8121GPC/HT (manufactured by Tosoh Corporation)
GPC column: three TSKgel $GMH_6$-HTs (manufactured by Tosoh Corporation)
Measurement temperature: 140° C.
Solvent and mobile phase: ortho-dichlorobenzene containing 0.05% by mass of dibutyl hydroxytoluene (Wako Pure Chemical Industries, special grade)
Mobile phase flow rate: 1.0 mL/min
Concentration of sample solution: 1 mg/mL
Injection amount: 300 μL
Molecular weight standard material: standard polystyrene
Data reading interval: 2.5 sec The intrinsic viscosity (hereinafter, denoted by [η], a unit is dl/g) of the component (A) is preferably 1.0 dl/g or more, more preferably 1.2 dl/g or more, and still more preferably 1.3 dl/g or more, from the viewpoint of improving slipperiness of a film. In addition, [η] of the component (A) is preferably 2.0 dl/g or less, more preferably 1.9 dl/g or less, and still more preferably 1.7 dl/g or less, from the viewpoint of suppressing fish eyes in a film. In one embodiment, [η] of the component (A) is preferably 1.0 dl/g to 2.0 dl/g, in another embodiment, [η] of the component (A) is preferably 1.2 dl/g to 1.9 dl/g, and in still another embodiment, [η] of the component (A) is preferably 1.3 dl/g to 1.7 dl/g. [η] of the component (A) is measured using an Ubbelohde viscometer at a temperature of 135° C. by using tetralin as a solvent.

The ethylene-α-olefin copolymer according to the present embodiment has: a monomer unit (1) based on ethylene; and a monomer unit (2) based on an α-olefin having 3 to 20 carbon atoms, wherein a branching parameter represented by Equation (i) is 0.70 to 0.90, and a light scattering area ratio represented by Equation (ii) is 1.60 to 3.60. When the branching parameter of the ethylene-α-olefin copolymer is in the above range, a degree of branching of the polymer can be maintained in a desired range. As a result, a film having excellent slipperiness can be formed. In addition, when the light scattering area ratio of the ethylene-α-olefin copolymer is in the above range, a content of a gel component (a component having a large molecular weight) contained in the polymer can be maintained in a desired range. As a result, a film having excellent slipperiness and suppressed fish eyes can be formed.

The branching parameter of the ethylene-α-olefin copolymer according to the present embodiment is preferably 0.70 to 0.80. With this configuration, a film having excellent slipperiness can be formed.

The light scattering area ratio of the ethylene-α-olefin copolymer according to the present embodiment is preferably 2.70 to 3.00. With this configuration, a film having excellent slipperiness and suppressed fish eyes can be formed.

When the total mass of the ethylene-α-olefin copolymer according to the present embodiment is 100% by mass, the content of the monomer unit (1) is preferably 90% by mass or more, and the content of the monomer unit (2) is preferably 10% by mass or less. With this configuration, a film having excellent slipperiness and suppressed fish eyes can be formed.

The melt flow rate (MFR) of the ethylene-α-olefin copolymer according to the present embodiment measured under conditions of a temperature of 190° C. and a load of 21.18 N is preferably 0.010 g/10 min to 0.2 g/10 min. When the MFR of the ethylene-α-olefin copolymer is 0.010 g/10 min or more, the extrusion load during film formation can be reduced. In addition, when the MFR of the ethylene-α-olefin copolymer is 0.2 g/10 min or less, a film having excellent slipperiness can be formed.

The density of the ethylene-α-olefin copolymer according to the present embodiment is preferably 910 kg/m$^3$ to 940 kg/m$^3$. When the density of the ethylene-α-olefin copolymer is 910 kg/m$^3$ or more, a film having excellent slipperiness can be formed. In addition, when the density of the ethylene-α-olefin copolymer is 940 kg/m$^3$ or less, a film having suppressed fish eyes can be formed.

Method of Producing Ethylene-α-Olefin Copolymer

There is provided a method of producing an ethylene-α-olefin copolymer (component (A)) according to the present embodiment, the ethylene-α-olefin copolymer having the monomer unit (1) based on the ethylene and the monomer unit (2) based on the α-olefin having 3 to 20 carbon atoms, the method including the following steps (a) to (c) of:

(a) pre-polymerizing ethylene and an α-olefin having 3 to 20 carbon atoms in the presence of a catalyst component obtained by bringing a metallocene-based complex, an organoaluminum compound, and a co-catalyst support into contact with each other to obtain a pre-polymerized catalyst component;

(b) bringing an organoaluminum compound into contact with oxygen gas and then into contact with an electron donating compound to obtain a coordination compound; and (c) performing gas phase polymerization on ethylene and an α-olefin having 3 to 20 carbon atoms in the presence of a polymerization catalyst obtained by bringing the pre-polymerized catalyst component and the coordination compound into contact with each other to obtain an ethylene-α-olefin copolymer.

In the step (a), the metallocene-based complex is a transition metal compound having a ligand with a cyclopentadiene-type anion skeleton. As the metallocene-based complex, a transition metal compound represented by the following General Formula [1] or a μ-oxo type transition metal compound dimer thereof is preferable.

$$L^2{}_a M^2 X^1{}_b \qquad [1]$$

Wherein $M^2$ is a transition metal atom of groups 3 to 11 or the lanthanide series of the periodic table, $L^2$ is a group having a cyclopentadiene-type anion skeleton, and a plurality of Ls may be directly linked to each other, or may be linked to each other through a residue containing a carbon atom, a silicon atom, a nitrogen atom, an oxygen atom, a sulfur atom, or a phosphorus atom, and $X^1$ is a halogen atom, a hydrocarbon group (excluding a group having a cyclopentadiene-type anion skeleton), or a hydrocarbon oxy group, a represents 2, and b represents 2.

In General Formula [1], $M^2$ is a transition metal atom of groups 3 to 11 or the lanthanide series of the periodic table (IUPAC, 1989), and examples thereof can include a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom, and an ytterbium atom. In General Formula [1], $M^2$ is preferably a titanium atom, a zirconium atom, a hafnium atom, a vanadium atom, a chromium atom, an iron atom, a cobalt atom, or a nickel atom, more preferably a titanium atom, a zirconium atom, or a hafnium atom, and still more preferably a zirconium atom.

In General Formula [1], $L^2$ is an $\eta^5$-(substituted) indenyl group, and two $L^2$s may be the same as or different from each other. The two $L^2$s may be linked to each other through a cross-linking group containing a carbon atom, a silicon atom, a nitrogen atom, an oxygen atom, a sulfur atom, or a phosphorus atom. The $\eta^5$-(substituted) indenyl group represents an $\eta^5$-indenyl group which may have a substituent.

Examples of the $\eta^5$-(substituted) indenyl group in $L^2$ is an $\eta^5$-(substituted) indenyl group having at least hydrogen atoms at the 5-position and the 6-position, and specific examples thereof can include an $\eta^5$-indenyl group, an $\eta^5$-2-methylindenyl group, an $\eta^5$-3-methylindenyl group, an $\eta^5$-4-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4-phenylindenyl group, an $\eta^5$-2-methyl-4-phenylindenyl group, an $\eta^5$-2-methyl-4-naphthylindenyl group, and substituents thereof. It should be noted that herein, regarding the name of the transition metal compound, "$\eta^5$-" may be omitted. $L^2$ is preferably an indenyl group.

Two (substituted) indenyl groups may be linked to each other through a cross-linking group containing a carbon atom, a silicon atom, a nitrogen atom, an oxygen atom, a sulfur atom, or a phosphorus atom. Examples of the cross-linking group can include an alkylene group such as an ethylene group or a propylene group; a substituted alkylene group such as a dimethylmethylene group or a diphenylmethylene group; a silylene group; a substituted silylene group such as a dimethylsilylene group, a diphenylsilylene group, or a tetramethyldisilylene group; and a hetero atom such as a nitrogen atom, an oxygen atom, a sulfur atom, or a phosphorus atom. The cross-linking group is preferably an ethylene group, a dimethylmethylene group, or a dimethylsilylene group, and more preferably an ethylene group.

Examples of $X^1$ in General Formula [1] can include a halogen atom, a hydrocarbon group (excluding a group having a cyclopentadiene-type anion skeleton), and a hydrocarbon oxy group. Examples of the halogen atom can include a fluorine atom, a chlorine atom, a bromine atom, and an iodine atom. Examples of the hydrocarbon group can include an alkyl group, an aralkyl group, an aryl group, and an alkenyl group. Examples of the hydrocarbon oxy group can include an alkoxy group, an aralkyloxy group, and an aryloxy group.

Examples of the alkyl group can include a methyl group, an ethyl group, an n-propyl group, an isopropyl group, an n-butyl group, a sec-butyl group, a tert-butyl group, an isobutyl group, an n-pentyl group, a neopentyl group, an amyl group, an n-hexyl group, an n-octyl group, an n-decyl group, an n-dodecyl group, an n-pentadecyl group, and an n-eicosyl group. The alkyl group may be substituted with a halogen atom such as a fluorine atom, a chlorine atom, a bromine atom, or an iodine atom. Examples of the alkyl group substituted with the halogen atom can include a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, and a perbromopropyl group. In all of the alkyl groups, some hydrogen atoms may be substituted with an alkoxy group such as a methoxy group or an ethoxy group; an aryloxy group such as a phenoxy group; and an aralkyloxy group such as a benzyloxy group.

Examples of the aralkyl group can include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (penta methylphenyl)methyl group, an (ethylphenyl)methyl group, an (n-propylphenyl)methyl group, an (isopropylphenyl)methyl group, an (n-butylphenyl)methyl group, a (sec-butylphenyl)methyl group, a (tert-(butylphenyl)methyl group, an (n-pentylphenyl)methyl group, a (neopentylphenyl)methyl group, an (n-hexylphenyl)methyl group, an (n-octylphenyl)methyl group, an (n-decylphenyl)methyl group, an (n-dodecylphenyl)methyl group, a naphthylmethyl group, and an anthracenylmethyl group. The aralkyl group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group.

Examples of the aryl group can include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, an n-propylphenyl group, an isopropylphenyl group, an n-butylphenyl group, a sec-butylphenyl group, a tert-butylphenyl group, an n-pentylphenyl group, a neopentylphenyl group, an n-hexylphenyl group, an n-octylphenyl group, an n-decylphenyl group, an n-dodecylphenyl group, an n-tetradecylphenyl group, a naphthyl group, and an anthracenyl group. The aryl group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group.

Examples of the alkenyl group can include an allyl group, a methallyl group, a crotyl group, and a 1,3-diphenyl-2-propenyl group.

Examples of the alkoxy group can include a methoxy group, an ethoxy group, an n-propoxy group, an isopropoxy group, an n-butoxy group, a sec-butoxy group, a tert-butoxy group, an n-pentoxy group, a neopentoxy group, an n-hexoxy group, an n-octoxy group, an n-dodesoxy group, an n-pentadesoxy group, and an n-icosoxy group. The alkoxy group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group.

Examples of the aralkyloxy group can include a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl) methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl) methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl) methoxy group, a (2,3,5,6-tetramethylphenyl) methoxy group, a (pentamethylphenyl)methoxy group, an (ethylphenyl)methoxy group, an (n-propylphenyl)methoxy group, an (isopropylphenyl)methoxy group, an (n-butylphenyl) methoxy group, a (sec-butylphenyl)methoxy group, a (tert-butylphenyl)methoxy group, an (n-hexylphenyl)methoxy group, an (n-octylphenyl)methoxy group, an (n-decylphenyl)methoxy group, a naphthylmethoxy group, and an anthracenylmethoxy group. The aralkyloxy group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group.

Examples of the aryloxy group can include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, an n-propylphenoxy group, an isopropylphenoxy group, an n-butylphenoxy group, a sec-butylphenoxy group, a tert-butylphenoxy group, an n-hexylphenoxy group, an n-octylphenoxy group, an n-decylphenoxy group, an n-tetradecylphenoxy group, a naphthoxy group, and an anthracenoxy group. The aryloxy group may have a substituent such as a halogen atom such as a fluorine atom, a chlorine atom, a bromine atom, or an iodine atom; an alkoxy group such as a methoxy group or an ethoxy group; aryloxy group such as a phenoxy group; or an aralkyloxy group such as a benzyloxy group. $X^1$ is preferably a chlorine atom, a methoxy group, or a phenoxy group, more preferably a chlorine atom or a phenoxy group, and still more preferably a phenoxy group.

Specific examples of the metallocene-based complex can include dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl) titanium dichloride, dimethylsilylenebis(2,4,7-trimethylindenyl)titanium dichloride, dimethylsilylenebis(2-methyl-4-isopropylindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, and dimethylsilylenebis(2-methyl-4-naphthylindenyl)titanium dichloride, compounds in which titanium of these compounds is changed to zirconium or hafnium, compounds in which dimethylsilylene of these compounds is changed to methylene, ethylene, dimethylmethylene (isopropylidene), diphenylmethylene, diethylsilylene, diphenylsilylene, or dimethoxysilylene, and compounds in which dichloride of these compounds is changed to difluoride, dibromide, diiodide, dimethyl, diethyl, diisopropyl, diphenyl, dibenzyl, dimethoxide, diethoxide, di(n-propoxide), di(isopropoxide), diphenoxide, or di(pentafluorophenoxide).

The metallocene-based complex is preferably ethylenebis(indenyl)zirconium dichloride, dimethylsilylenebis(indenyl)zirconium dichloride, dimethylmethylenebis(indenyl)zirconium dichloride, ethylenebis(indenyl)zirconium diphenoxide, dimethylsilylenebis(indenyl)zirconium diphenoxide, or dimethylmethylenebis(Indenyl)zirconium diphenoxide, and more preferably ethylenebis(indenyl)zirconium diphenoxide.

In the step (a), examples of the organoaluminum compound can include trimethyl aluminum, triethyl aluminum, tributyl aluminum, triisobutylaluminum, and tri-n-octyl aluminum. As the organoaluminum compound, triisobutylaluminum or tri-n-octyl aluminum is preferable, and triisobutylaluminum is more preferable.

In the step (a), the co-catalyst support (hereinafter, also referred to as a component (H)) is a support obtained by supporting a component (I) on a particulate support.

The component (I) is preferably a zinc compound. That is, the component (H) is preferably a support obtained by supporting a zinc compound on a particulate support. An example of the zinc compound can include a compound obtained by bringing diethyl zinc (I1), fluorinated phenol (I2), and water (I3) into contact with each other.

Examples of the fluorinated phenol (I2) can include 3,4,5-trifluorophenol, 3,4,5-tris(trifluoromethyl)phenol, 3,4,5-tris(pentafluorophenyl)phenol, 3,5-difluoro-4-pentafluorophenylphenol, and 4,5,6,7,8-pentafluoro-2-naphthol. The fluorinated phenol is preferably 3,4,5-trifluorophenol.

The particulate support is formed of a porous substance having a 50% volume average particle diameter of 10 to 500 µm. The 50% volume average particle diameter is measured by a light scattering laser diffraction method. Examples of the particulate support can include an inorganic substance and an organic polymer. Examples of the inorganic substance can include an inorganic oxide such as $SiO_2$, $Al_2O_3$, MgO, $ZrO_2$, $TiO_2$, $B_2O_3$, CaO, ZnO, BaO, or $ThO_2$; and a clay and clay mineral such as smectite, montmorillonite, hectorite, laponite, or saponite. Examples of the organic polymer can include polyethylene, polypropylene, and a styrene-divinylbenzene copolymer. The particulate support is preferably a particulate support formed of an inorganic substance (hereinafter, referred to as an inorganic particulate support).

A pore volume of the particulate support is generally 0.3 to 10 mL/g. A specific area of the particulate support is generally 10 to 1,000 $m^2$/g. The pore volume and the specific area are measured by a gas adsorption method. The pore volume is calculated by analyzing the gas desorption amount by a BJH method, and the specific area is calculated by analyzing the gas adsorption amount by a BET method.

The component (H) can be obtained by bringing diethyl zinc (I1) which is the component (I), fluorinated phenol (I2), and water (I3), an inorganic particulate support (H1), and trimethyldisilazane (((CH$_3$)$_3$Si)$_2$NH) (H2) into contact with each other.

The inorganic particulate support (H1) is preferably silica gel.

In a method of producing the component (I), when a molar ratio of the used amounts of the components is 1:y:z (component (I1):component (I2):component (I3)), each of the component (I1), the component (I2), and the component (I3) can be used so that y and z satisfy the following expressions.

$$|2-y-2z| \leq 1 \quad [2]$$

$$z \geq -2.5y + 2.48 \quad [3]$$

$$y < 1 \quad [4]$$

In Expressions [2] to [4], each of y and z represents a number larger than 0.

A molar ratio y of the used amount of component (I2) to the used amount of component (I1) and a molar ratio z of the used amount of component (I3) to the used amount of component (I1) is not particularly limited as long as Expressions [2], [3], and [4] are satisfied. y is generally 0.55 to 0.99, preferably 0.55 to 0.95, more preferably 0.6 to 0.9, and still more preferably 0.7 to 0.8. In order to obtain the ethylene-α-olefin copolymer according to the present embodiment, y is preferably 0.55 or more. When y is 1 or more, a film containing the obtained ethylene-α-olefin copolymer may have a defected appearance such as fish eyes.

The used amounts of component (I1) and component (H1) are adjusted so that the number of moles of a zinc atom derived from the diethyl zinc (I1) contained in 1 g of particles obtained by bringing the diethyl zinc (I1) and the inorganic particulate support (H1) into contact with each other is preferably 0.1 mmol or more, and more preferably 0.5 to 20 mmol. The used amount of trimethyldisilazane (H2) to the used amount of component (H1) is preferably 0.1 mmol or more, and more preferably 0.5 to 20 mmol with respect to 1 g of the component (H1).

The used amount of metallocene-based complex is preferably $5 \times 10^{-6}$ to $5 \times 10^{-4}$ mol with respect to 1 g of the component (H). The used amount of organoaluminum compound is preferably 1 to 2,000, which is represented by a ratio (Al/M) of the number of moles of the aluminum atom of the organoaluminum compound to the number of moles of the metal atom of the metallocene-based complex.

More specifically, the step (a) preferably includes the following steps (a1) to (a5).

Step (a1): heat-treating a saturated aliphatic hydrocarbon compound solution containing a metallocene-based complex at 40° C. or higher to obtain a heat-treated material Step (a2): bringing the heat-treated material obtained in the step (a1) and a co-catalyst support into contact with each other to obtain a contact-treated material Step (a3): bringing the contact-treated material obtained in the step (a2) and an organoaluminum compound into contact with each other to obtain a catalyst component Step (a4): pre-polymerizing ethylene in the presence of the catalyst component obtained in the step (a3) to obtain a pre-polymerized catalyst component Step (a5): classifying the pre-polymerized catalyst component obtained in the step (a4)

In the step (a1), the saturated aliphatic hydrocarbon compound solution containing the metallocene-based complex is prepared by a method of adding a metallocene-based complex to a saturated aliphatic hydrocarbon compound solvent. In general, the metallocene-based complex is added as powder or slurry of a saturated aliphatic hydrocarbon compound solution.

Examples of a saturated aliphatic hydrocarbon compound used in the preparation of the saturated aliphatic hydrocarbon compound solution containing the metallocene-based complex can include propane, n-butane, isobutane, n-pentane, isopentane, n-hexane, cyclohexane, and heptane. For the saturated aliphatic hydrocarbon compound solution, the saturated aliphatic hydrocarbon compounds may be used alone or in combination of two or more thereof. A boiling point of the saturated aliphatic hydrocarbon compound at a normal pressure is preferably 100° C. or lower, and more preferably 90° C. or lower. As the saturated aliphatic hydrocarbon compound, propane, n-butane, isobutane, n-pentane, isopentane, n-hexane, or cyclohexane is further preferable.

In the heat treatment of the saturated aliphatic hydrocarbon compound solution containing the metallocene-based complex, the temperature of the saturated aliphatic hydrocarbon compound solvent containing the metallocene-based complex is preferably adjusted to a temperature of 40° C. or higher. During the heat treatment, the solvent may be left to stand or stirred. The temperature is preferably 45° C. or higher, and more preferably 50° C. or higher, from the viewpoint of improving moldability of a film. In addition, the temperature is preferably 100° C. or lower, and more preferably 80° C. or lower, from the viewpoint of improving catalyst activity. A time for the heat treatment is generally 0.5 to 12 hours. The time is preferably 1 hour or longer, and more preferably 2 hours or longer, from the viewpoint of improving moldability of a film. In addition, the time is preferably 6 hours or shorter, and more preferably 4 hours or shorter, from the viewpoint of stability of catalyst performance.

In the step (a2), it is preferable that the heat-treated material and the component (H) are brought into contact with each other. Examples of a contacting method can include a method of adding the component (H) to the heat-treated material, and a method of adding the heat-treated material and the component (H) to the saturated aliphatic hydrocarbon compound. In general, the component (H) is added as powder or slurry of a saturated aliphatic hydrocarbon compound solvent.

The temperature of the contact treatment in the step (a2) is preferably 70° C. or lower, and more preferably 60° C. or lower. In addition, the temperature is preferably 10° C. or higher, and more preferably 20° C. or higher. In general, the time for the contact treatment is 0.1 hours to 2 hours.

In the step (a3), it is preferable that the contact-treated material obtained in the step (a2) and the organoaluminum compound are brought into contact with each other. Examples of a contacting method can include a method of adding the organoaluminum compound to the contact-treated material obtained in the step (a2), and a method of adding the contact-treated material obtained in the step (a2) and the organoaluminum compound to the saturated aliphatic hydrocarbon compound.

The temperature of the contact treatment in the step (a3) is preferably 70° C. or lower, and more preferably 60° C. or lower. In addition, the temperature is preferably 10° C. or higher, and more preferably 20° C. or higher, from the viewpoint of efficiently expressing activation of pre-polymerization. In general, the time for the contact treatment is 0.01 hours to 0.5 hours.

The contact treatment in the step (a3) is preferably performed in the presence of ethylene, and if necessary, may be performed in the co-presence of ethylene and an α-olefin having 3 to 20 carbon atoms. In general, an olefin which is a raw material in the pre-polymerization may be used as the ethylene and the α-olefin. The amount of each of ethylene and α-olefin is preferably 0.05 g to 1 g per 1 g of the component (H).

The steps (a1) to (a3) may be performed by separately adding the saturated aliphatic hydrocarbon compound, the component (H), the metallocene-based complex, and the organoaluminum compound to a pre-polymerization reactor. All of the steps (a1) to (a3) may be performed in the pre-polymerization reactor, the steps (a2) and (a3) may be performed in the pre-polymerization reactor, or the step (a3) may be performed in the pre-polymerization reactor.

The step (a4) is a step of pre-polymerizing ethylene and an α-olefin having 3 to 20 carbon atoms (polymerization of ethylene and an α-olefin in a small amount) in the presence of the catalyst component obtained in the step (a3) to obtain a pre-polymerized catalyst component. In general, the pre-polymerization may be performed by a slurry polymerization method. The pre-polymerization may be performed by any one of batch type, semi-batch type, and continuous polymerization methods. Furthermore, the pre-polymerization may be performed by adding a chain transfer agent such as hydrogen.

In a case where the pre-polymerization is performed by a slurry polymerization method, in general, a saturated aliphatic hydrocarbon compound is used as a solvent. Examples of the saturated aliphatic hydrocarbon compound can include propane, n-butane, isobutane, n-pentane, isopentane, n-hexane, cyclohexane, and heptane. For the saturated aliphatic hydrocarbon compound solution, the saturated aliphatic hydrocarbon compounds may be used alone or in combination of two or more thereof. A boiling point of the saturated aliphatic hydrocarbon compound at a normal pressure is preferably 100° C. or lower, and more preferably 90° C. or lower. As the saturated aliphatic hydrocarbon compound, propane, n-butane, isobutane, n-pentane, isopentane, n-hexane, or cyclohexane is further preferable.

In the case where the pre-polymerization is performed by a slurry polymerization method, as a slurry concentration, the amount of component (H) per liter of a solvent is generally 0.1 to 600 g, and preferably 0.5 to 300 g. A pre-polymerization temperature is generally −20 to 100° C., and preferably 0 to 80° C. The pre-polymerization temperature may be appropriately changed during the pre-polymerization, but an initial temperature of the pre-polymerization is preferably 45° C. or lower, and more preferably 40° C. or lower. In addition, a partial pressure of olefins in a gas phase during the pre-polymerization is generally 0.001 to 2 MPa, and more preferably 0.01 to 1 MPa. The time for the pre-polymerization is generally 2 minutes to 15 hours.

Examples of the α-olefin having 3 to 20 carbon atoms used in the pre-polymerization can include propylene, 1-butene, 1-pentene, 1-hexene, 1-heptene, 1-octene, 1-nonene, 1-decene, 1-dodecene, 4-methyl-1-pentene, and 4-methyl-1-hexene. Among them, the α-olefin having 3 to 20 carbon atoms is preferably 1-hexene, 4-methyl-1-pentene, or 1-octene, and more preferably 1-hexene or 1-octene. The α-olefins having 3 to 20 carbon atoms may be used alone or in combination of two or more thereof.

A content of the pre-polymerized polymer in the pre-polymerized catalyst component is generally 0.01 to 1,000 g, preferably 0.05 to 500 g, and more preferably 0.1 to 200 g, per 1 g of the component (H).

The step (a5) is a step of removing fine pre-polymerized catalyst components under a sieve by drying the pre-polymerized catalyst component obtained in the step (a4) by nitrogen circulation and passing the dried pre-polymerized catalyst component through the sieve through which pre-polymerized catalyst particles for fine olefin polymerization pass. An opening of the sieve is generally 100 μm to 200 μm, and preferably 140 μm to 160 μm. In general, the step (a5) is performed under inert gas atmosphere such as nitrogen or argon.

More specifically, the step (b) preferably includes the following steps (b1) and (b2).

Step (b1): bringing an organoaluminum compound and oxygen gas into contact with each other to obtain a contact-treated material Step (b2): bringing the contact-treated material obtained in the step (b1) and an electron donating compound into contact with each other to obtain a coordination compound In the step (b1), the used amount of oxygen gas brought into contact with the organoaluminum compound is preferably 1 to 100 mol %, more preferably 5 to 80 mol %, and still more preferably 10 to 40 mol %, with respect to the number of moles of an aluminum atom of the organoaluminum compound.

The temperature of the contact treatment in the step (b1) is preferably 70° C. or lower, and more preferably 50° C. or lower. In addition, the temperature is preferably 30° C. or higher, and more preferably 40° C. or higher.

In the step (b2), examples of the electron donating compound can include triethylamine, triisobutylamine, and tri-n-octylamine, and the electron donating compound is preferably triethylamine.

The used amount of electron donating compound is preferably 1 to 50 mol %, and more preferably 3 to 20 mol %, with respect to the number of moles of the aluminum atom of the organoaluminum compound.

In the step (b2), it is preferable that the contact-treated material obtained in the step (b1) and the electron donating compound are brought into contact with each other. As a contacting method, for example, a method of adding the electron donating compound to the contact-treated material obtained in the step (b1) is used.

The temperature of the contact treatment in the step (b2) is preferably 70° C. or lower, and more preferably 50° C. or lower. In addition, the temperature is preferably 30° C. or higher, and more preferably 40° C. or higher.

In the step (c), an ethylene-α-olefin copolymer is obtained by a gas phase polymerization method. Preferably, an ethylene-α-olefin copolymer is obtained by a continuous gas phase polymerization method. As a gas phase polymerization reaction apparatus used in the continuous gas phase polymerization method, an apparatus having a fluidized bed type reaction tank is generally used, and an apparatus having an enlarged fluidized bed type reaction tank is preferably used. Stirring blades may be installed in the reaction tank.

In the step (c), the polymerization catalyst is a polymerization catalyst containing a pre-polymerized catalyst component. In general, as a method of supplying the pre-polymerized catalyst component to a continuous polymerization reaction tank that performs formation of particles of the component (A), a method of supplying the pre-polymerized catalyst component in a moisture-free state by using inert gas such as argon, nitrogen, hydrogen, ethylene, or the like, or a method of dissolving or diluting each component in a solvent and supplying the pre-polymerized catalyst component in a solution or slurry state is used.

The polymerization temperature is generally lower than the temperature at which the component (A) is melted, preferably 0 to 150° C., more preferably 30 to 100° C., and still more preferably 70° C. to 87° C. In order to adjust melt fluidity of the component (A), hydrogen may be added. It is preferable that hydrogen is controlled so that a ratio thereof is 0.01 to 1.1 mol % with respect to 100 mol % of ethylene. The ratio of the hydrogen to the ethylene during the gas phase polymerization can be controlled by the amount of hydrogen generated during the polymerization and the amount of hydrogen added during the polymerization. Inert gas may coexist in mixed gas in the polymerization reaction tank.

After the step of producing the component (A) in a continuous gas phase polymerization reaction tank, a step of transferring the component (A) to a container different from the gas phase polymerization tank to bring the component (A) into contact with water may be included. In this step, it is preferable that water is mixed with nitrogen, and the mixture is heated at 50° C. or higher and then brought into contact with the component (A). In addition, it is preferable that the water mixed with nitrogen has a vapor pressure less than a saturated vapor pressure, and is brought into contact with the component (A) as gas. Furthermore, the time for contact of water with the component (A) is generally 0.5 to 3 hours, and preferably 1 to 2 hours.

The method of producing an ethylene-α-olefin copolymer according to the present embodiment is a method of producing an ethylene-α-olefin copolymer having a monomer unit (1) based on ethylene and a monomer unit (2) based on an α-olefin having 3 to 20 carbon atoms, the method including the above steps (a) to (c). A film having excellent slipperiness and suppressed fish eyes can be formed by using the ethylene-α-olefin copolymer obtained by the production method.

In the method of producing an ethylene-α-olefin copolymer according to the present embodiment, the co-catalyst support is preferably a support obtained by supporting a zinc compound on a particulate support. With this configuration, a film having excellent slipperiness can be formed.

Ethylene-Based Resin Composition

An ethylene-based resin composition according to the present embodiment contains: the ethylene-α-olefin copolymer (component (A)); and an ethylene-based polymer having a monomer unit based on ethylene (different from the ethylene-α-olefin copolymer) (hereinafter, also referred to as a component (B)).

A melt flow rate (MFR) of the component (B) measured under conditions of a temperature of 190° C. and a load of 21.18 N is preferably 0.010 g/10 min or more, and more preferably 0.1 g/10 min or more, and still more preferably 1 g/10 min or more, from the viewpoints of moldability of a film, and in particular, reducing an extrusion load during film formation. In addition, the MFR of the component (B) is preferably 5 g/10 min or less, more preferably 4 g/10 min or less, and still more preferably 3 g/10 min or less, from the viewpoint of strength of a film. In one embodiment, the MFR of the component (B) is 0.010 g/10 min to 5 g/10 min. In the measurement of the MFR of the component (B), a sample obtained by mixing about 1,000 ppm of an antioxidant with the component (B) is generally used. The MFR can be adjusted in a range of 0.010 g/10 min to 5 g/10 min by adjusting a concentration of a chain transfer agent during the polymerization.

A density of the component (B) is preferably 910 kg/m$^3$ or more, more preferably 911 kg/m$^3$ or more, and still more preferably 912 kg/m$^3$ or more, from the viewpoint of improving slipperiness of a film. In addition, the density of the component (B) is preferably 940 kg/m$^3$ or less, more preferably 930 kg/m$^3$ or less, and still more preferably 920 kg/m$^3$ or less, from the viewpoint of improving strength of a film. In one embodiment, the density of the component (B) is 910 kg/m$^3$ to 940 kg/m$^3$.

In one embodiment, the melt flow rate of the component (B) measured under conditions of a temperature of 190° C. and a load of 21.18 N is 0.01 g/10 min to 5 g/10 min, and the density of the component (B) is 910 kg/m$^3$ to 940 kg/m$^3$.

A ratio (hereinafter, denoted by Mz/Mw) of a z average molecular weight (hereinafter, also referred to as Mz) of the component (B) to a weight average molecular weight (hereinafter, also referred to as Mw) of the component (B) is preferably 1.3 or more, more preferably 1.4 or more, and still more preferably 1.5 or more, from the viewpoint of improving heat sealability, transparency, and strength of a film. In addition, Mz/Mw of the component (B) is preferably 2.2 or less, more preferably 2.1 or less, and still more preferably 2.0 or less, from the viewpoint of reducing an extrusion load during film formation. In one embodiment, Mz/Mw of the component (B) is 1.3 to 2.2, in another embodiment, Mz/Mw of the component (B) is 1.4 to 2.1, and in still another embodiment, Mz/Mw of the component (B) is 1.5 to 2.0. The weight average molecular weight (Mw) and the z average molecular weight (Mz) are calculated by the same method as that in the component (A).

The component (B) can be produced by polymerizing a metallocene-based polymerization catalyst, or ethylene in the presence of a Ziegler-Natta polymerization catalyst.

Examples of the metallocene-based polymerization catalyst can include the following (C1) to (C4) catalysts.

(C1) A catalyst composed of a component containing a transition metal compound having a group having a cyclopentadiene-type skeleton and a component containing an alumoxane compound (C2) A catalyst composed of a component containing the transition metal compound and an ionic compound such as trityl borate or anilinium borate (C3) A catalyst composed of a component containing the transition metal compound, a component containing the ionic compound, and an organoaluminum compound (C4) A catalyst obtained by supporting or impregnating each component according to any one of (C1) to (C3) on an inorganic particulate support such as SiO$_2$ or Al$_2$O$_3$ or a particulate polymer support such as an olefin polymer such as ethylene or styrene As the Ziegler-Natta polymerization catalyst, a so-called Mg—Ti-based Ziegler catalyst obtained by combining a solid catalyst component in which a titanium compound is supported on a magnesium compound with organoaluminum (see, for example, "Catalyst utilization dictionary; published by Kogyo Chosakai Publishing Co., Ltd., in 2004", "Application system diagram-transition of olefin polymerization catalyst-; published by Japan Institute of Invention and Innovation in 1995", and the like) is preferably used.

The catalyst used for production of the component (B) is preferably a metallocene-based polymerization catalyst, from the viewpoint of strength of a film.

Examples of the polymerization method for the component (B) can include a bulk polymerization method, a solution polymerization method, a slurry polymerization method, a gas phase polymerization method, and a high-pressure ionic polymerization method. The bulk polymerization method refers to a method of performing polymerization by using a liquid olefin as a medium at a polymerization temperature. Each of the solution polymerization method and the slurry polymerization method refers to a method of performing polymerization in an inert hydrocarbon solvent such as propane, butane, isobutane, pentane, hexane, heptane, or octane. In addition, the gas phase polymerization method refers to a method in which a gaseous monomer is used as a medium and a gaseous monomer is polymerized in the medium. These polymerization methods may be either a batch type or a continuous type, and may be either a single-stage type performed in a single polymerization tank or a multi-stage type performed in a polymerization apparatus in which a plurality of polymerization reaction tanks are connected in series. Various conditions (polymerization temperature, polymerization pressure, monomer concentration, amount of catalyst added, polymerization time, and the like) in the polymerization step may be appropriately determined.

A content of the component (A) in the ethylene-based resin composition is preferably 1% by mass or more, more preferably 5% by mass or more, and still more preferably 10% by mass or more, with respect to a total content of 100% by mass of the component (A) and the component (B). In addition, the content of the component (A) in the ethylene-based resin composition is preferably 30% by mass or less, more preferably 28% by mass or less, and still more preferably 25% by mass or less, with respect to the total content of 100% by mass of the component (A) and the component (B). In one embodiment, the content of the component (A) in the ethylene-based resin composition is 1% by mass to 30% by mass with respect to the total content of 100% by mass of the component (A) and the component (B).

A method of producing the ethylene-based resin composition is not particularly limited, and examples thereof can include known blending methods. Examples of the known blending method can include a method of dry blending each polymer and a method of melt-blending each polymer. Examples of the dry blending method can include methods using various blenders such as a Henschel mixer and a tumbler mixer. Examples of the melt-blending method can include methods using various mixers such as a single screw extruder, a twin-screw extruder, a Banbury mixer, and a heat roll.

The ethylene-based resin composition according to the present embodiment contains the ethylene-α-olefin copolymer (component (A)) and the ethylene-based polymer having a monomer unit based on ethylene (component (B)). With this configuration, a film having excellent slipperiness and suppressed fish eyes can be formed.

It is preferable that a melt flow rate of the ethylene-based resin composition according to the present embodiment measured under conditions of a temperature of 190° C. and a load of 21.18 N is 0.01 g/10 min to 5 g/10 min, and the density of the ethylene-based resin composition according to the present embodiment is 910 kg/m³ to 940 kg/m³. With this configuration, a film having excellent slipperiness and suppressed fish eyes can be formed.

In the ethylene-based resin composition according to the present embodiment, a content of the ethylene-α-olefin copolymer is preferably 1% by mass to 30% by mass with respect to a total content of 100% by mass of the ethylene-α-olefin copolymer and the ethylene-based polymer. With this configuration, a film having excellent slipperiness and suppressed fish eyes can be formed.

Film

A film according to the present embodiment contains the ethylene-α-olefin copolymer or the ethylene-based resin composition.

The film may contain a lubricant and/or an anti-blocking agent. In addition, the film may contain an antioxidant, a neutralizing agent, a weather-resistant agent, an antistatic agent, an anti-fogging agent, a non-dripping agent, a pigment, and a filler, as an additive.

A content of the lubricant and/or the anti-blocking agent in the film is preferably 200 ppm by weight or less. The content of the lubricant and/or the anti-blocking agent in the film is more preferably 100 ppm by weight or less, still more preferably 50 ppm by weight or less, and particularly preferably 30 ppm by weight or less. It is preferable that the film substantially does not contain a lubricant and/or an anti-blocking agent.

The film may be a single-layered film including only a layer α containing the ethylene-α-olefin copolymer or the ethylene-based resin composition, or may be a multi-layered film including the layers a. In a case where the film is a multi-layered film, the multi-layered film may be a multi-layered film having two surface layers, and at least one of the two surface layers is a layer α.

The film is a multi-layered film including a layer α and a layer β containing an ethylene-based polymer (the layer β is different from the layer α). The film may be a multi-layered film having two surface layers, and at least one of the two surface layers may be the layer α.

The film is a multi-layered film including a layer α and a layer γ that does not contain an ethylene-based polymer (the layer γ is different from the layer α). The film may be a multi-layered film having two surface layers, and at least one of the two surface layers may be the layer α.

In the multi-layered film, examples of the ethylene-based polymer contained in the layer β can include a high pressure low density polyethylene and an ethylene-α-olefin copolymer that does not contain the component (A).

In the multi-layered film, examples of a material constituting the layer γ can include cellophane, paper, paperboard, fabric, an aluminum foil, a polyamide resin such as nylon 6 or nylon 66, a polyester resin such as polyethylene terephthalate or polybutylene terephthalate, and a polypropylene resin.

The multi-layered film including the layer α and the layer γ is a multi-layered film having two surface layers and at least one of the two surface layers is the layer α. Examples thereof can include a double-layered film including a layer α and a layer γ in which one surface layer is the layer α and the other surface layer is the layer γ.

The multi-layered film including the layer α and the layer γ is a multi-layered film having two surface layers and at least one of the two surface layers is the layer α. Examples thereof can include a multi-layered film including a layer α, a layer β, and a layer γ in which one surface layer is the layer α and the other surface layer is the layer γ.

Examples of a method of producing a single-layered film or a multi-layered film can include an extrusion molding method such as an inflation film molding method or a T die film molding method, an injection molding method, and a compression molding method. The method of producing a single-layered film or a multi-layered film is preferably an inflation film molding method.

In a case where the multi-layered film is a multi-layered film including a layer α and a layer γ, as a method of producing the multi-layered film, a lamination method of laminating a single-layered film including only a layer α or a multi-layered film including a layer α and a layer β on a layer γ may be used. Examples of the lamination method can include a dry laminate method, a wet laminate method, and a sand laminate method. The lamination method is preferably a dry laminate method.

The film according to the present embodiment can be used for a packing container and used for packing various contents. Examples of the content can include foods, beverages, seasonings, dairy products such as milk, medicines, electronic components such as semiconductor products, pet foods, pet care products, detergents, and toiletries.

A film according to the present embodiment contains the ethylene-α-olefin copolymer or the ethylene-based resin composition. With this configuration, the film can have excellent slipperiness and suppressed fish eyes.

The ethylene-α-olefin copolymer, the method of producing an ethylene-α-olefin copolymer, the ethylene-based resin composition, and the film according to the present embodiment are not particularly limited to the above embodiment, and various modifications can be made without departing from the gist of the present invention. In addition, configurations, methods, or the like of embodiments other than the above embodiments may be optionally employed and combined, and configurations, methods, or the like according to one embodiment may be applied to configurations, methods, or the like according to another embodiment.

EXAMPLES

Hereinafter, the present invention will be described in more detail with reference to examples and comparative examples. However, the present invention is not limited to the following examples.

Measurement Method

A value of each item in examples and comparative examples was measured according to the following method.

Element Analysis

Zn: A sample was added to an aqueous sulfuric acid solution (concentration: 1 M) and irradiated with ultrasonic waves to extract a metal component. The resulting solution was quantified by an ICP emission analysis method.

F: A sample was burned in a flask filled with oxygen, the generated combustion gas was absorbed into an aqueous sodium hydroxide solution (10%), and the resulting aqueous solution was quantified by an ion electrode method.

Melt Flow Rate (MFR, unit: g/10 min)

A melt flow rate was measured under conditions of a temperature of 190° C. and a load of 21.18 N by the method A defined in JIS K7210-1995.

Density (Unit: kg/m³)

A density was measured by the method A defined in JIS K7112-1980 after performing annealing described in JIS K6760-1995.

<Mw>

A polystyrene-reduced weight average molecular weight (Mw) was calculated by gel permeation chromatography (GPC) measurement.

GPC apparatus: HLC-8121GPC/HT (manufactured by Tosoh Corporation)
GPC column: three TSKgel $GMH_6$-HTs (manufactured by Tosoh Corporation)
Measurement temperature: 140° C.
Solvent and mobile phase: ortho-dichlorobenzene containing 0.05% by mass of dibutyl hydroxytoluene (Wako Pure Chemical Industries, special grade)
Mobile phase flow rate: 1.0 mL/min
Injection amount: 300 μL
Detector: differential refractometer
Molecular weight standard material: standard polystyrene
Data reading interval: 2.5 sec Limiting Viscosity ([η], unit: dl/g)

A polymer was dissolved in a tetralin solvent, and a limiting viscosity was measured at 135° C. using an Ubbelohde viscometer. A film containing an ethylene-α-olefin copolymer of which a limiting viscosity is in a range of 1.4 to 1.6 has excellent slipperiness and suppressed fish eyes.

Melting Point (Tm, unit: ° C.) and Crystallization Temperature (Tc, unit: ° C.)

A melting point and a crystallization temperature were measured with a thermal analyzer and a differential scanning calorimeter (Diamond DSC, manufactured by Perkin Elmer Inc.) by the following stages 1) to 3). The melting point was determined as an endothermic peak of a heat flow curve observed in stage 3), and the crystallization temperature was determined as an exothermic peak of a heat flow curve observed in stage 2).

1) About 10 mg of a sample was kept under a nitrogen atmosphere at 150° C. for 5 minutes
2) The sample was cooled from 150° C. to 20° C. (5° C./min) for 2 minutes
3) The sample was heated from 20° C. to 150° C. (5° C./min)

A film containing an ethylene-α-olefin copolymer with a small difference (Tm−Tc) between Tm and Tc has excellent slipperiness.

Calculation of Branching Parameter

A branching parameter was calculated by measuring an absolute molecular weight M of the ethylene-α-olefin copolymer, a weight fraction $W_M$ of the ethylene-α-olefin copolymer in the absolute molecular weight M, and an intrinsic viscosity $[η]_M$ of the ethylene-α-olefin copolymer in the absolute molecular weight M in each example and each comparative example by using a gel permeation chromatography (GPC) apparatus equipped with a differential refractive index detector, a viscosity detector, and a light scattering detector.

The measurement is performed under the following conditions.

GPC apparatus: HLC-8121GPC/HT (manufactured by Tosoh Corporation)
Light scattering detector: PD2040 (manufactured by Precision Detectors Inc.)
Laser light source: wavelength 685 nm
Viscosity detector: H502 (manufactured by Viscotek Corporation)
GPC column: three GMHHR-H(S) HTs (manufactured by Tosoh Corporation)
Concentration of sample solution: 2 mg/mL
Injection amount: 300 μL
Measurement temperature: 140° C.
Dissolution condition: stirring at 145° C. for 2 hours
Solvent and mobile phase: ortho-dichlorobenzene containing 0.05% by mass of dibutyl hydroxytoluene (Wako Pure Chemical Industries, special grade)
Mobile phase flow rate: 1.0 mL/min
Measurement time: about 1 hour
Molecular weight standard material: standard polystyrene
Data reading interval: 1.74 sec Specifically, a light scattering detector (LS) was connected to the GPC apparatus equipped with a differential refractive index detector (RI). A scattering angle used in the light scattering detection was 90°. A viscosity detector (VISC) was further connected to the GPC apparatus. LS and VISC were installed in a column oven of the GPC apparatus, and LS, RI, and VISC were sequentially connected to the GPC apparatus.

For calibration for LS and VISC and correction of delay volumes between detectors, a polystyrene standard material Polycal TDS-PS-N (weight average molecular weight Mw: 104,349, polydispersity: 1.04) produced by Malvern Instruments Limited was used at a solution concentration of 1 mg/mL.

In addition, as a GPC column, three GMHHR-H(S) HTs (manufactured by Tosoh Corporation) were connected to each other and used. Then, the temperature of each of the GPC columns, a sample injection part, and the detectors was set to 140° C.

Each of refractive index increments (dn/dc) of the sample and the NIST Standard Reference Material Linear polyethylene 1475a in ortho-dichlorobenzene was −0.078 mL/g. dn/dc of the polystyrene standard material was 0.079 mL/g. The refractive index increment is a change rate of a refractive index to a concentration change.

In the calculation of the absolute molecular weight M and the intrinsic viscosity $[\eta]_M$ (unit: dl/g) of the sample from data from each detector, calculation was carried out by using data processing software OmniSEC (version 4.7) produced by Malvern Instruments Limited with reference to the literature "Size Exclusion Chromatography, Springer (1999)".

Calculation of Light Scattering Area Ratio

A light scattering area ratio was calculated by measuring a light scattering area LS of a solution obtained by dissolving the ethylene-α-olefin copolymer of each of examples and comparative examples in ortho-dichlorobenzene at a concentration of 2 mg/mL and a light scattering area LS' of a solution obtained by dissolving the NIST Standard Reference Material Linear polyethylene 1475a in ortho-dichlorobenzene at a concentration of 2 mg/mL using a liquid chromatography (LC) apparatus equipped with a light scattering detector.

The measurement is performed under the following conditions.

LC apparatus: HLC-8121GPC/HT (manufactured by Tosoh Corporation)
Light scattering detector: PD2040 (manufactured by Precision Detectors Inc.)
Laser light source: wavelength 685 nm
GPC column: none
Concentration of sample solution: 2 mg/mL
Injection amount: 300 μL
Measurement temperature: 140° C.
Dissolution condition: stirring at 145° C. for 2 hours
Automatic shaker for dissolution: DF-8020 (manufactured by Tosoh Corporation)
Solvent and mobile phase: ortho-dichlorobenzene containing 0.05% by mass of dibutyl hydroxytoluene (Wako Pure Chemical Industries, special grade)
Mobile phase flow rate: 1.0 mL/min
Measurement time: about 10 minutes
Data reading interval: 2.5 sec Specifically, the light scattering detector (LS) was connected to the LC apparatus. A scattering angle used in the light scattering detection was 90°. LS was installed in a column oven of the LC apparatus.

Specifically, the sample was dissolved by the following procedure. First, 40.0 mg of a sample and 20.0 mL of a solvent were injected to a 30 mL screw vial, the screw vial was tightly sealed and set in a DF-8020 (manufactured by Tosoh Corporation), and stirring was performed at 140° C. for 2 hours, thereby dissolving the sample. The sample solution obtained by the method was filtered, before analysis, using a cylindrical filter paper (Whatman cylindrical filter paper, diameter 18 mm×length 55 mm, model: 2800-185) having a pore diameter of 8 μm. The filtering was performed at 140° C. or higher in order to avoid deposition of the sample, the filter paper was immersed in the sample solution, the solution in an immersed state was allowed to stand for 10 minutes to be equilibrated, and the sample solution leached in the cylindrical filter paper was provided for analysis. The filtering was performed within 20 minutes in order to prevent a concentration of the sample solution from being changed due to evaporation of the solvent.

A GPC column and a guard column were not used to prevent an ultra high molecular component from being captured by a column. In addition, in order to obtain chromatogram, one SUS tube having an inner diameter of 0.75 mm and a length of 5 m was mounted between the sample injection part and the LS detector, and the temperature of each of the sample injection part and the detectors were set to 140° C.

A baseline of the obtained LS chromatogram was processed, and a light scattering area was calculated. Data processing software OmniSEC (version 4.7) produced by Malvern Instruments Limited was used to obtain the light scattering area.

Method for Evaluating Physical Properties of Film

Physical properties of the films in examples and comparative examples were evaluated according to the following method.

Number of Fish Eyes (Unit: /m$^2$)

The number of fish eyes in the produced film was analyzed using SCANTEC Elements 2 (NAGASE & CO., LTD.), and the number of film defects (fish eyes) having a size of 0.2 mm or more per 1 m$^2$ under conditions of a detection length of 100 m and a detection width of 100 mm. A film having the number of fish eyes of 30/m$^2$ or less was rated as acceptable.

Tan θ (Slipperiness)

Two films of 160 mm (length)×80 mm (width) were cut from the produced film. One of the two films (hereinafter, referred to as a sample film (1)) was disposed on an inclined plate of a friction angle measurement device (manufactured by Toyo Seiki Seisakusho Co., Ltd.). At this time, an upper surface of the sample film (1) was set as an inner surface of a tube at the time of forming an inflation film. The other film (hereinafter, referred to as a sample film (2)) was attached to a lower surface of a thread (weight: 1 kg) of 100 mm (length)×65 mm (width). At this time, the sample film (2) was attached such that the thread surface was in contact with an outer surface of the tube at the time of forming the inflation film of the sample film (2). The sample film (2) attached to the thread was placed to be in contact with the sample film (1) disposed on the inclined plate. The inclined plate was inclined at an inclination increase rate of 2.7°/sec, and an angle θ at which the thread started to move was measured and indicated by tan θ (face-to-face). A film having tan θ (face-to-face) of 1.6 or less was rated as acceptable. Since the friction angle measurement device cannot make θ larger than 70°, a case in which the thread does not start to move when θ is 70° was described as "unmeasurable".

Tensile Breaking Strength (Unit: MPa)

Test pieces with longitudinal directions which were a withdrawal direction (MD) and a direction (TD) orthogonal to the MD direction, respectively, were prepared from the formed film, according to a sampling method for measuring a tensile breaking load described in JIS K 6781 6.4. A tensile test was performed by using the obtained test pieces under conditions of a distance between chucks of 80 mm, a distance between marked lines of 40 mm, and a tensile speed of 500 mm/min to obtain a tensile breaking strength. A film having a high tensile breaking strength is excellent in mechanical strength.

Tensile Breaking Elongation (Unit: %)

Test pieces with longitudinal directions which were a withdrawal direction (MD) and a direction (TD) orthogonal to the MD direction, respectively, were prepared from the formed film, according to a sampling method for measuring a tensile breaking load described in JIS K 6781 6.4. A tensile test was performed by using the obtained test pieces under conditions of a distance between chucks of 80 mm, a distance between marked lines of 40 mm, and a tensile speed of 500 mm/min to obtain a tensile breaking elongation. A film having a high tensile breaking elongation is excellent in mechanical strength.

Production of Component (A)

A component (A) was produced by the following production examples.

Production Example 1

Production of Component (H)

A component (H) was produced in the same manner for the production of the component (A) in each of Examples (1) and (2) described in JP-A-2009-79180. As a result of element analysis, Zn was 11% by mass and F was 6.4% by mass.

Production of Pre-Polymerized Catalyst Component 4.15 $m^3$ of butane was added to a previously nitrogen-purged autoclave having an internal volume of 9,000 liters with a stirrer, 6.0 mol of racemic-ethylenebis(1-indenyl) zirconium diphenoxide was added thereto, the temperature of the autoclave was increased to 50° C., and the mixture was stirred for 2 hours. Next, 60.4 kg of the produced component (H) was added to the autoclave. Thereafter, the temperature of the autoclave was decreased to 30° C., the system was stabilized, 5 kg of ethylene and 5 liters of hydrogen (normal temperature and normal pressure) were added to the autoclave, 35.1 L of a hexane solution obtained by diluting triisobutylaluminum with n-hexane at 20 wt %, and pre-polymerization was started. Ethylene and hydrogen (normal temperature and normal pressure) were supplied to the autoclave for 30 minutes at 60 kg/hr and 30 liter/hr, respectively, and the temperature of the autoclave was increased to 50° C., and ethylene and hydrogen (normal temperature and normal pressure) were supplied to the autoclave at 159 kg/hr and 0.54 $m^3$/hr, respectively. A total of 15.4 hours of pre-polymerization was carried out. After completion of the pre-polymerization, ethylene, butane, hydrogen, or the like was purged, and the remaining solid was vacuum-dried at room temperature, thereby obtaining a pre-polymerized catalyst component containing 41.1 g of polyethylene per 1 g of the component (H). [η] of the polyethylene was 1.21 dl/g. Thereafter, the resulting pre-polymerized catalyst component was injected into a Hi-Bolter with a mesh having an opening of 162 μm manufactured by TOYO HITEC Co., LTD., and fine powder was removed under a nitrogen atmosphere, thereby obtaining a pre-polymerized catalyst component from which the fine pre-polymerized catalyst components were removed.

Production of Polymer

In the presence of the resulting pre-polymerized catalyst component, copolymerization of ethylene, 1-butene, and 1-hexene was carried out in a continuous fluidized bed gas phase polymerization apparatus to obtain ethylene-1-butene-1-hexene copolymer (hereinafter, referred to as LLDPE-1) powder. As polymerization conditions, a polymerization temperature was set to 89° C., a polymerization pressure was set to 2 MPa, an average ratio of the amount of hydrogen with respect to 100 mol % of ethylene was set to 0.35%, a molar ratio of 1-butene and a molar ratio of 1-hexene with respect to a sum of ethylene, 1-butene, and 1-hexene were set to 1.45% and 0.53%, respectively. During the polymerization, ethylene, 1-butene, 1-hexene, and hydrogen were continuously supplied to maintain a gas composition constant. In addition, the pre-polymerized catalyst component, triisobutylaluminum (a molar ratio of triisobutylaluminum with respect to a weight of LLDPE-1 powder: 0.44 mol/t), triethylamine (a molar ratio thereof with respect to triisobutylaluminum: 10.7%), and oxygen (a molar ratio thereof with respect to triisobutylaluminum: 24%) were continuously supplied. The order of contact between the pre-polymerized catalyst component, triisobutylaluminum, triethylamine, and oxygen was as follows: first, a contact-treated material was obtained by bringing triisobutylaluminum and oxygen into contact with each other, subsequently, a coordination compound was obtained by bringing the contact-treated material and triethylamine into contact with each other and the coordination compound was injected to a gas phase polymerization tank, and finally, the coordination compound was brought into contact with the pre-polymerized catalyst component. A total powder weight in the fluidized bed was kept constant at 50.7 t. An average polymerization time was 7.4 hr. The LLDPE-1 powder was transferred to a hopper through a transfer pipe connected to the continuous fluidized bed gas phase polymerization apparatus and the hopper. Mixed gas obtained by mixing nitrogen having a flow rate of 250 $m^3$/hr with water having a flow rate of 6 L/hr and heating the mixture at 65° C. was injected to the hopper to bring water into contact with the LLDPE-1 powder. The time for contact with water in the hopper was 1.3 hours. The LLDPE-1 powder in contact with water was transferred to another hopper through a transfer pipe, and the LLDPE-1 powder was dried by circulating nitrogen in the hopper. The dried LLDPE-1 powder was granulated under conditions of a feed speed of 50 kg/hr, a screw rotational speed of 450 rpm, a gate opening degree of 50%, a suction pressure of 0.1 MPa, and a resin temperature of 200 to 230° C. using an extruder (LCM50, manufactured by KOBE STEEL, LTD.) to obtain LLDPE-1 pellets. Physical properties of the resulting LLDPE-1 pellets were evaluated, and the results are shown in Table 1.

Production Example 2

Production of Polymer

In the presence of the resulting pre-polymerized catalyst component of Production Example 1, copolymerization of ethylene, 1-butene, and 1-hexene was carried out in a continuous fluidized bed gas phase polymerization apparatus to obtain ethylene-1-butene-1-hexene copolymer (hereinafter, referred to as LLDPE-2) powder. As polymerization conditions, a polymerization temperature was set to 89° C., a polymerization pressure was set to 2 MPa, an average ratio of the amount of hydrogen with respect to 100 mol % of ethylene was set to 0.35%, a molar ratio of 1-butene and a molar ratio of 1-hexene with respect to a sum of ethylene, 1-butene, and 1-hexene were set to 1.34% and 0.52%, respectively. During the polymerization, ethylene, 1-butene, 1-hexene, and hydrogen were continuously supplied to maintain a gas composition constant. In addition, the pre-polymerized catalyst component, triisobutylaluminum (a molar ratio of triisobutylaluminum with respect to a weight of LLDPE-2 powder: 0.40 mol/t), triethylamine (a molar ratio thereof with respect to triisobutylaluminum: 9.7%), and oxygen (a molar ratio thereof with respect to triisobutylaluminum: 24%) were continuously supplied. The order of contact between the pre-polymerized catalyst component, triisobutylaluminum, triethylamine, and oxygen was the same as that of Production Example 1. A total powder weight in the fluidized bed was kept constant at 52.2 t. An average polymerization time was 7.1 hr. The LLDPE-2 powder was transferred to a hopper through a transfer pipe connected to the continuous fluidized bed gas phase polymerization apparatus and the hopper. Water heated to 100° C. or higher was injected to the hopper to bring the water into contact with the LLDPE-2 powder. The time for contact with water in the hopper was 1.3 hours. The LLDPE-2 powder in contact with water was transferred to another hopper through a transfer pipe, and the LLDPE-2 powder was dried by circulating nitrogen in the hopper. The dried LLDPE-2 powder was granulated under conditions of a feed speed of 50 kg/hr, a screw rotational speed of 450 rpm, a gate opening degree of 50%, a suction pressure of 0.1 MPa, and a resin temperature of 200 to 230° C. using an extruder (LCM50, manufactured by KOBE STEEL, LTD.) to obtain LLDPE-2 pellets. Physical properties of the resulting LLDPE-2 pellets were evaluated, and the results are shown in Table 1.

Production Example 3

Production of Polymer

In the presence of the resulting pre-polymerized catalyst component of Production Example 1, copolymerization of ethylene, 1-butene, and 1-hexene was carried out in a continuous fluidized bed gas phase polymerization apparatus to obtain ethylene-1-butene-1-hexene copolymer (hereinafter, referred to as LLDPE-3) powder. As polymerization conditions, a polymerization temperature was set to 89° C., a polymerization pressure was set to 2 MPa, an average ratio of the amount of hydrogen with respect to 100 mol % of ethylene was set to 0.33%, a molar ratio of 1-butene and a molar ratio of 1-hexene with respect to a sum of ethylene, 1-butene, and 1-hexene were set to 1.33% and 0.53%, respectively. During the polymerization, ethylene, 1-butene, 1-hexene, and hydrogen were continuously supplied to maintain a gas composition constant. In addition, the pre-polymerized catalyst component, triisobutylaluminum (a molar ratio of triisobutylaluminum with respect to a weight of LLDPE-3 powder: 0.44 mol/t), triethylamine (a molar ratio thereof with respect to triisobutylaluminum: 10.2%), and oxygen (a molar ratio thereof with respect to triisobutylaluminum: 24%) were continuously supplied. The order of contact between the pre-polymerized catalyst component, triisobutylaluminum, triethylamine, and oxygen was the same as that of Production Example 1. A total powder weight in the fluidized bed was kept constant at 52.9 t. An average polymerization time was 6.6 hr. The LLDPE-3 powder was transferred to a hopper through a transfer pipe connected to the continuous fluidized bed gas phase polymerization apparatus and the hopper. Mixed gas obtained by mixing nitrogen having a flow rate of 250 m³/hr with water having a flow rate of 6 L/hr and heating the mixture at 65° C. was injected to the hopper to bring water into contact with the LLDPE-3 powder. The time for contact with water in the hopper was 1.3 hours. The LLDPE-3 powder in contact with water was transferred to another hopper through a transfer pipe, and the LLDPE-3 powder was dried by circulating nitrogen in the hopper. The dried LLDPE-3 powder was granulated under conditions of a feed speed of 50 kg/hr, a screw rotational speed of 450 rpm, a gate opening degree of 50%, a suction pressure of 0.1 MPa, and a resin temperature of 200 to 230° C. using an extruder (LCM50, manufactured by KOBE STEEL, LTD.) to obtain LLDPE-3 pellets. Physical properties of the resulting LLDPE-3 pellets were evaluated, and the results are shown in Table 1.

Production Example 4

Production of Polymer

In the presence of the resulting pre-polymerized catalyst component of Production Example 1, copolymerization of ethylene, 1-butene, and 1-hexene was carried out in a continuous fluidized bed gas phase polymerization apparatus to obtain ethylene-1-butene-1-hexene copolymer (hereinafter, referred to as LLDPE-4) powder. As polymerization conditions, a polymerization temperature was set to 89° C., a polymerization pressure was set to 2 MPa, an average ratio of the amount of hydrogen with respect to 100 mol % of ethylene was set to 0.28%, a molar ratio of 1-butene and a molar ratio of 1-hexene with respect to a sum of ethylene, 1-butene, and 1-hexene were set to 1.37% and 0.55%, respectively. During the polymerization, ethylene, 1-butene, 1-hexene, and hydrogen were continuously supplied to maintain a gas composition constant. In addition, the pre-polymerized catalyst component, triisobutylaluminum (a molar ratio of triisobutylaluminum with respect to a weight of LLDPE-4 powder: 0.47 mol/t), triethylamine (a molar ratio thereof with respect to triisobutylaluminum: 9.0%), and oxygen (a molar ratio thereof with respect to triisobutylaluminum: 24%) were continuously supplied. The order of contact between the pre-polymerized catalyst component, triisobutylaluminum (a molar ratio of triisobutylaluminum with respect to the weight of the LLDPE-4 powder: 0.47 mol/t), triethylamine, and oxygen was the same as that of Production Example 1. A total powder weight in the fluidized bed was kept constant at 52.7 t. An average polymerization time was 6.8 hr. The LLDPE-4 powder was transferred to a hopper through a transfer pipe connected to the continuous fluidized bed gas phase polymerization apparatus and the hopper. Mixed gas obtained by mixing nitrogen having a flow rate of 250 m³/hr with water having a flow rate of 6 L/hr and heating the mixture at 65° C. was injected to the hopper to bring water into contact with the LLDPE-4 powder. The time for contact with water in the hopper was 1.3 hours. The LLDPE-4 powder in contact with water was transferred to another hopper through a transfer pipe, and the LLDPE-4 powder was dried by circulating nitrogen in the hopper. The dried LLDPE-4 powder was granulated under conditions of a feed speed of 50 kg/hr, a screw rotational speed of 450 rpm, a gate opening degree of 50%, a suction pressure of 0.1 MPa, and a resin temperature of 200 to 230° C. using an extruder (LCM50, manufactured by KOBE STEEL, LTD.) to obtain LLDPE-4 pellets. Physical properties of the resulting LLDPE-4 pellets were evaluated, and the results are shown in Table 1.

Production Example 5

Production of Polymer

In the presence of the resulting pre-polymerized catalyst component of Production Example 1, copolymerization of ethylene, 1-butene, and 1-hexene was carried out in a continuous fluidized bed gas phase polymerization apparatus to obtain ethylene-1-butene-1-hexene copolymer (hereinafter, referred to as LLDPE-5) powder. As polymerization conditions, a polymerization temperature was set to 89° C., a polymerization pressure was set to 2 MPa, an average ratio of the amount of hydrogen with respect to 100 mol % of ethylene was set to 0.22%, a molar ratio of 1-butene and a molar ratio of 1-hexene with respect to a sum of ethylene, 1-butene, and 1-hexene were set to 1.35% and 0.51%, respectively. During the polymerization, ethylene, 1-butene, 1-hexene, and hydrogen were continuously supplied to maintain a gas composition constant. In addition, the pre-polymerized catalyst component, triisobutylaluminum (a molar ratio of triisobutylaluminum with respect to a weight of LLDPE-5 powder: 0.42 mol/t), triethylamine (a molar ratio thereof with respect to triisobutylaluminum: 10.2%), and oxygen (a molar ratio thereof with respect to triisobutylaluminum: 24%) were continuously supplied. The order of contact between the pre-polymerized catalyst component, triisobutylaluminum, triethylamine, and oxygen was the same as that of Production Example 1. A total powder weight in the fluidized bed was kept constant at 52.0 t. An average polymerization time was 7.1 hr. The LLDPE-5 powder was transferred to a hopper through a transfer pipe connected to the continuous fluidized bed gas phase polymerization apparatus and the hopper. Mixed gas obtained by mixing nitrogen having a flow rate of 250 m$^3$/hr with water having a flow rate of 6 L/hr and heating the mixture at 65° C. was injected to the hopper to bring water into contact with the LLDPE-5 powder. The time for contact with water in the hopper was 1.3 hours. The LLDPE-5 powder in contact with water was transferred to another hopper through a transfer pipe, and the LLDPE-5 powder was dried by circulating nitrogen in the hopper. The dried LLDPE-5 powder was granulated under conditions of a feed speed of 50 kg/hr, a screw rotational speed of 450 rpm, a gate opening degree of 50%, a suction pressure of 0.1 MPa, and a resin temperature of 200 to 230° C. using an extruder (LCM50, manufactured by KOBE STEEL, LTD.) to obtain LLDPE-5 pellets. Physical properties of the resulting LLDPE-5 pellets were evaluated, and the results are shown in Table 1.

hydrogen (normal temperature and normal pressure) were added to the autoclave, 240 mmol of triisobutylaluminum was subsequently added to the autoclave, and pre-polymerization was started. Ethylene and hydrogen (normal temperature and normal pressure) were supplied to the autoclave for 30 minutes at 0.5 kg/hr and 1.1 liter/hr, respectively, and the temperature of the autoclave was increased to 50° C., and ethylene and hydrogen (normal temperature and normal pressure) were supplied to the autoclave at 2.7 kg/hr and 8.2 liter/hr, respectively. A total of 10.0 hours of pre-polymerization was carried out. After completion of the pre-polymerization, ethylene, butane, hydrogen, or the like was purged, and the remaining solid was vacuum-dried at room temperature, thereby obtaining a pre-polymerized catalyst component containing 39.6 g of polyethylene per 1 g of the component (H). [ii] of the polyethylene was 1.17 dl/g.

Production of Polymer

In the presence of the resulting pre-polymerized catalyst component, copolymerization of ethylene and 1-hexene was carried out in a continuous fluidized bed gas phase polymerization apparatus to obtain ethylene-1-hexene copolymer (hereinafter, referred to as LLDPE-6) powder. As polymerization conditions, a polymerization temperature was set to 96° C., a polymerization pressure was set to 2 MPa, an average ratio of the amount of hydrogen with respect to 100 mol % of ethylene was set to 0.30%, a molar ratio of 1-hexene with respect to a sum of ethylene and 1-hexene was set to 0.86%. During the polymerization, ethylene, 1-hexene, and hydrogen were continuously supplied to maintain a gas composition constant. In addition, the pre-polymerized catalyst component, triisobutylaluminum (a molar ratio of triisobutylaluminum with respect to a weight of LLDPE-6 powder: 0.47 mmol/kg), triethylamine (a molar ratio thereof with respect to triisobutylaluminum: 29%), and oxygen (a molar ratio thereof with respect to triisobutylaluminum: 21%) were continuously supplied. The order of contact between the pre-polymerized catalyst component, triisobutylaluminum, triethylamine, and oxygen was as follows: first, a contact material was obtained by bringing

TABLE 1

|  |  | LLDPE-1 | LLDPE-2 | LLDPE-3 | LLDPE-4 | LLDPE-5 |
| --- | --- | --- | --- | --- | --- | --- |
| MFR | g/10 min | 0.036 | 0.049 | 0.08 | 0.107 | 0.083 |
| Density | kg/m$^3$ | 924 | 926 | 928 | 929 | 929 |
| Mw | g/mol | 130201 | 133228 | 128325 | 118395 | 131334 |
| [η] | dl/g | 1.49 | 1.47 | 1.45 | 1.41 | 1.42 |
| Tm | ° C. | 111.2 | 112.8 | 114.3 | 115.1 | 115.1 |
| Tc | ° C. | 105.4 | 107 | 107.8 | 108.4 | 108.4 |
| Tm-Tc | ° C. | 5.8 | 5.8 | 6.5 | 6.7 | 6.7 |
| Branching parameter | — | 0.73 | 0.76 | 0.76 | 0.75 | 0.78 |
| Light scattering area ratio | — | 2.95 | 2.93 | 2.9 | 2.88 | 2.79 |

Production Example 6

Production of Pre-Polymerized Catalyst Component 41 liters of butane were added to a previously nitrogen-purged autoclave having an internal volume of 210 liters with a stirrer, 60.9 mmol of racemic-ethylenebis(1-indenyl) zirconium diphenoxide was added thereto, the autoclave was heated to 50° C., and the mixture was stirred for 2 hours. Next, 0.60 kg of the component (H) obtained in Production Example 1 was added to the autoclave. Thereafter, the temperature of the autoclave was increased to 31° C., the system was stabilized, 0.1 kg of ethylene and 0.1 liters of triisobutylaluminum and triethylamine into contact with each other, subsequently, a contact material obtained by bringing oxygen into contact with the above contact material was injected to a gas phase polymerization tank, and finally, the contact material was brought into contact with the pre-polymerized catalyst component. A total powder weight in the fluidized bed was kept constant at 80 kg. An average polymerization time was 3.7 hr. The resulting LLDPE-6 powder was transferred to a hopper through a transfer pipe connected to the continuous fluidized bed gas phase polymerization apparatus and the hopper. Methanol at room temperature was injected to the hopper to bring the methanol into contact with the LLDPE-6 powder. The time for contact with methanol in the hopper was 1 hour. The LLDPE-6 powder in contact with methanol was transferred to another hopper through a transfer pipe, and the LLDPE-6 powder was dried by circulating nitrogen in the hopper. The dried LLDPE-6 powder was granulated under conditions of a feed speed of 50 kg/hr, a screw rotational speed of 450 rpm, a gate opening degree of 50%, a suction pressure of 0.1 MPa, and a resin temperature of 200 to 230° C. using an extruder (LCM50, manufactured by KOBE STEEL, LTD.) to obtain LLDPE-6 pellets. Physical properties of the resulting LLDPE-6 pellets were evaluated, and the results are shown in Table 2.

Production Example 7

Production of Polymer
In the presence of the pre-polymerized catalyst component from which fine pre-polymerized catalyst components were removed obtained in Production Example 1, copolymerization of ethylene and 1-hexene was carried out in a continuous fluidized bed gas phase polymerization apparatus to obtain ethylene-1-hexene copolymer (hereinafter, referred to as LLDPE-7) powder. As polymerization conditions, a polymerization temperature was set to 87° C., a polymerization pressure was set to 2 MPa, an average ratio of the amount of hydrogen with respect to 100 mol % of ethylene was set to 1.89%, a molar ratio of 1-hexene with respect to a sum of ethylene and 1-hexene was set to 1.29%. During the polymerization, ethylene, 1-hexene, and hydrogen were continuously supplied to maintain a gas composition constant. In addition, the pre-polymerized catalyst component, triisobutylaluminum (a molar ratio of triisobutylaluminum with respect to a weight of LLDPE-7 powder: 0.39 mol/t), and triethylamine (a molar ratio thereof with respect to triisobutylaluminum: 4%) were continuously supplied. A total powder weight in the fluidized bed was kept constant at 43.5 t. An average polymerization time was 4.2 hr. The LLDPE-7 powder was transferred to a hopper through a transfer pipe connected to the continuous fluidized bed gas phase polymerization apparatus and the hopper. Mixed gas obtained by mixing nitrogen having a flow rate of 250 $m^3$/hr with water having a flow rate of 6 L/hr and heating the mixture at 65° C. was injected to the hopper to bring water into contact with the LLDPE-7 powder. The time for contact of water in the hopper was 0.97 hours. The LLDPE-7 powder in contact with water was transferred to another hopper through a transfer pipe, and the LLDPE-7 powder was dried by circulating nitrogen in the hopper. The dried LLDPE-7 powder was granulated under conditions of a feed speed of 50 kg/hr, a screw rotational speed of 450 rpm, a gate opening degree of 50%, a suction pressure of 0.1 MPa, and a resin temperature of 200 to 230° C. using an extruder (LCM50, manufactured by KOBE STEEL, LTD.) to obtain LLDPE-7 pellets. Physical properties of the resulting LLDPE-7 pellets were evaluated, and the results are shown in Table 2.

Production Example 8

Production of Polymer
High pressure radical polymerization of ethylene was carried out under conditions of an average reaction temperature of 256° C. and a reaction pressure of 229 MPa using a tubular reactor. A polymerization initiator was supplied from four locations in the tubular reactor. The polymerization initiator was supplied to the tubular reactor as a solution in which mixed isoparaffin-based hydrocarbon is used as a solvent. t-Butylperoxy-2-ethylhexanoate and t-butylperoxybenzoate were used as the polymerization initiator. Propylene was used as a chain transfer agent. LDPE-1 in a molten state was granulated using an extruder to obtain LDPE-1 pellets. Physical properties of the resulting LDPE-1 pellets are shown in Table 2.

Production Example 9

Production of Polymer
LLDPE-8 was produced in the same manner as that of Production Example 4 described in JP-A-2000-44739 (that is, the order of contact between the pre-polymerized catalyst component and the triisobutylaluminum). LLDPE-8 powder was granulated using an extruder to obtain LLDPE-8 pellets. Physical properties of the resulting LLDPE-8 pellets were evaluated, and the results are shown in Table 2.

Production Example 10

Production of Polymer
In the presence of the resulting pre-polymerized catalyst component obtained in Production Example 6, copolymerization of ethylene, 1-butene, and 1-hexene was carried out in a continuous fluidized bed gas phase polymerization apparatus to obtain ethylene-1-butene-1-hexene copolymer (hereinafter, referred to as LLDPE-9) powder. As polymerization conditions, a polymerization temperature was set to 88.6° C., a polymerization pressure was set to 2 MPa, an average ratio of the amount of hydrogen with respect to 100 mol % of ethylene was set to 0.07%, a molar ratio of 1-butene and a molar ratio of 1-hexene with respect to a sum of ethylene, 1-butene, and 1-hexene were set to 1.23% and 0.56%, respectively. During the polymerization, ethylene, 1-butene, 1-hexene, and hydrogen were continuously supplied to maintain a gas composition constant. In addition, the pre-polymerized catalyst component, triisobutylaluminum (a molar ratio of triisobutylaluminum with respect to a weight of LLDPE-9 powder: 0.56 mmol/kg), and triethylamine (a molar ratio thereof with respect to triisobutylaluminum: 3.0%) were continuously supplied. The order of contact between the pre-polymerized catalyst component, triisobutylaluminum, and triethylamine was as follows: first, a contact material was obtained by bringing triisobutylaluminum and triethylamine into contact with each other, subsequently, the above contact material was injected to a gas phase polymerization tank, and finally, the contact material was brought into contact with the pre-polymerized catalyst component. A total powder weight in the fluidized bed was kept constant at 99 kg. An average polymerization time was 5.5 hr. The resulting LLDPE-9 powder was transferred to a hopper through a transfer pipe connected to the continuous fluidized bed gas phase polymerization apparatus and the hopper. Methanol at room temperature was injected to the hopper to bring the methanol into contact with the LLDPE-9 powder. The time for contact with methanol in the hopper was 1 hour. The LLDPE-9 powder in contact with methanol was transferred to another hopper through a transfer pipe, and the LLDPE-9 powder was dried by circulating nitrogen in the hopper. The dried LLDPE-9 powder was granulated under conditions of a feed speed of 50 kg/hr, a screw rotational speed of 450 rpm, a gate opening degree of 50%, a suction pressure of 0.1 MPa, and a resin temperature of 200 to 230° C. using an extruder (LCM50, manufactured by KOBE STEEL, LTD.) to obtain LLDPE-9 pellets. Physical properties of the resulting LLDPE-9 pellets were evaluated, and the results are shown in Table 2.

TABLE 2

|  |  | LLDPE-6 | LLDPE-7 | LDPE-1 | LLDPE-8 | LLDPE-9 |
| --- | --- | --- | --- | --- | --- | --- |
| MFR | g/10 min | 0.0072 | 1.9 | 2 | 2 | 0.033 |
| Density | kg/m³ | 926 | 920 | 923 | 913 | 924 |
| Mw | g/mol | 150043 | 68464 | 72181 | 85597 | 144733 |
| [η] | dl/g | 1.66 | 0.97 | 0.91 | 1.5 | 1.76 |
| Tm | °C. | 115.5 | 108.2 | 108.8 | 111.7 | 111.9 |
| Tc | °C. | 109.1 | 100.8 | 98.9 | 98 | 109.6 |
| Tm-Tc | °C. | 6.4 | 7.4 | 9.9 | 13.7 | 2.3 |
| Branching parameter | — | 0.75 | 0.83 | 0.65 | 0.89 | 0.79 |
| Light scattering area ratio | — | 3.63 | 1.5 | 1.97 | 1.58 | 3.63 |

Formation of Inflation Film

The following component was used as the component (B) described in each of examples and comparative examples.

Ethylene-1-hexene copolymer 2-1 (LLDPE 2-1): metallocene catalyst linear low density polyethylene Sumikacene E FV203N (produced by Sumitomo Chemical Co., Ltd., ethylene-1-hexene copolymer (no additive added), MFR: 2.0 g/10 min, density: 913 kg/m³, MFRR=16.7)

Example 1

LLDPE-1 and LLDPE 2-1 were mixed with each other by a tumble mixer at a blending composition of 20:80 (LLDPE-1:LLDPE 2-1). Next, the resulting mixture was processed using an inflation film molding machine manufactured by Placo Co., Ltd. (full flight type screw single screw extruder (diameter: 30 mmφ, L/D=28), a dice (die diameter: 50 mmφ, lip gap: 2.0 mm)), and a double slit air ring under conditions of a processing temperature of 170° C., an extrusion amount of 5.5 kg/hr, a frost line distance (FLD) of 200 mm, and a blow ratio of 1.8, thereby forming an inflation film having a thickness of 50 μm. Physical properties of the resulting inflation film were shown in Table 3.

Example 2

An inflation film was obtained in the same manner as that of Example 1, except that LLDPE-2 and LLDPE 2-1 were mixed with each other by a tumble mixer at a blending composition of 20:80 (LLDPE-2:LLDPE 2-1). Physical properties of the resulting inflation film were shown in Table 3.

Example 3

An inflation film was obtained in the same manner as that of Example 1, except that LLDPE-3 and LLDPE 2-1 were mixed with each other by a tumble mixer at a blending composition of 20:80 (LLDPE-3:LLDPE 2-1). Physical properties of the resulting inflation film were shown in Table 3.

Example 4

An inflation film was obtained in the same manner as that of Example 1, except that LLDPE-4 and LLDPE 2-1 were mixed with each other by a tumble mixer at a blending composition of 20:80 (LLDPE-4:LLDPE 2-1). Physical properties of the resulting inflation film were shown in Table 3.

Example 5

An inflation film was obtained in the same manner as that of Example 1, except that LLDPE-5 and LLDPE 2-1 were mixed with each other by a tumble mixer at a blending composition of 20:80 (LLDPE-5:LLDPE 2-1). Physical properties of the resulting inflation film were shown in Table 3.

Comparative Example 1

An inflation film was obtained in the same manner as that of Example 1, except that LLDPE-6 and LLDPE 2-1 were mixed with each other by a tumble mixer at a blending composition of 20:80 (LLDPE-6:LLDPE 2-1). Physical properties of the resulting inflation film were shown in Table 4.

Comparative Example 2

An inflation film was obtained in the same manner as that of Example 1, except that LLDPE-7 and LLDPE 2-1 were mixed with each other by a tumble mixer at a blending composition of 20:80 (LLDPE-7:LLDPE 2-1). Physical properties of the resulting inflation film were shown in Table 4.

Comparative Example 3

An inflation film was obtained in the same manner as that of Example 1, except that LDPE-1 and LLDPE 2-1 were mixed with each other by a tumble mixer at a blending composition of 20:80 (LLDPE-1:LLDPE 2-1). Physical properties of the resulting inflation film were shown in Table 4.

Comparative Example 4

An inflation film was obtained in the same manner as in Example 1 except that LLDPE-8 and LLDPE 2-1 were mixed with a tumble mixer in a composition of 20:80 (LLDPE-8:LLDPE 2-1). Physical properties of the resulting inflation film were shown in Table 4.

Comparative Example 5

An inflation film was obtained in the same manner as that of Example 1, except that LLDPE-9 and LLDPE 2-1 were mixed with each other by a tumble mixer at a blending composition of 20:80 (LLDPE-9:LLDPE 2-1). Physical properties of the resulting inflation film were shown in Table 4.

TABLE 3

|  |  | Example 1 | Example 2 | Example 3 | Example 4 | Example 5 |
|---|---|---|---|---|---|---|
| Number of fish eyes | /m² | 21.3 | 16.4 | 7.7 | 5.9 | 8.7 |
| tanθ (face-to-face) | — | — | 1.49 | 1.25 | 1.11 | 1.1 | 1.08 |
| Tensile breaking strength | MD | MPa | 48 | 47 | 47 | 47 | 51 |
|  | TD | MPa | 53 | 52 | 50 | 45 | 55 |
| Tensile breaking elongation | MD | % | 642 | 633 | 633 | 643 | 660 |
|  | TD | % | 745 | 689 | 675 | 657 | 700 |

TABLE 4

|  |  | Comparative Example 1 | Comparative Example 2 | Comparative Example 3 | Comparative Example 4 | Comparative Example 5 |
|---|---|---|---|---|---|---|
| Number of fish eyes | /m² | >1000 | 31.2 | 24.5 | 7.5 | >1000 |
| tanθ (face-to-face) | — | — | 1.34 | Unmeasurable | Unmeasurable | Unmeasurable | 1.19 |
| Tensile breaking strength | MD | MPa | 46 | 53 | 48 | 58 | 45 |
|  | TD | MPa | 44 | 58 | 42 | 55 | 44 |
| Tensile breaking elongation | MD | % | 623 | 648 | 652 | 625 | 633 |
|  | TD | % | 632 | 753 | 671 | 667 | 671 |

As shown in the results of Table 3, in the case of the ethylene-α-olefin copolymer of each example satisfying all of the constituent requirements of the present invention, a film having excellent slipperiness and suppressed fish eyes was formed.

On the other hand, as shown in the results of Table 4, in the case of the film containing the polymer of Comparative Example 1 obtained by bringing the organoaluminum compound into contact with the electron donating compound, then into contact with oxygen gas, and finally into contact with the pre-polymerized catalyst component, the light scattering area ratio exceeded the range defined in the present invention, and as a result, a lot of fish eyes were generated. In addition, in the case of the film containing the polymer of Comparative Example 5 obtained by bringing the organoaluminum compound into contact with the electron donating compound and then into contact with the pre-polymerized catalyst component, the light scattering area ratio exceeded the range defined in the present invention, and as a result, a lot of fish eyes were generated.

In addition, the film in which the polymer of Comparative Example 2 or 4 was contained having the light scattering area ratio smaller than the range defined in the present invention was inferior in slipperiness.

Furthermore, the film in which the polymer of Comparative Example 3 was contained having the branching parameter smaller than the range defined in the present invention was inferior in slipperiness.

What is claimed is:

1. An ethylene-α-olefin copolymer comprising:
a monomer unit (1) based on ethylene; and
a monomer unit (2) based on an α-olefin having 3 to 20 carbon atoms,
wherein a branching parameter represented by the following Equation (i) is 0.70 to 0.90, and
a light scattering area ratio represented by the following Equation (ii) is 1.60 to 3.60,

[Math. 1]

$$\text{Branching parameter} = \frac{\sum_{M=10^{4.3}}^{10^{5.5}} W_M \times g'_M}{\sum_{M=10^{4.3}}^{10^{5.5}} W_M} \quad \text{(i)}$$

wherein M represents an absolute molecular weight of the ethylene-α-olefin copolymer, $W_M$ represents a weight fraction of the ethylene-α-olefin copolymer in the absolute molecular weight M, and $g'_M$ represents an intrinsic viscosity ratio of the ethylene-α-olefin copolymer in the absolute molecular weight M, and

[Math. 2]

$$\text{Light scattering area ratio} = \frac{LS}{LS'} \quad \text{(ii)}$$

wherein LS represents a light scattering area of a solution obtained by dissolving the ethylene-α-olefin copolymer in ortho-dichlorobenzene at a concentration of 2 mg/mL, and LS' represents a light scattering area of a solution obtained by dissolving NIST Standard Reference Material Linear polyethylene 1475a in ortho-dichlorobenzene at a concentration of 2 mg/mL.

2. The ethylene-α-olefin copolymer according to claim 1, wherein the branching parameter is 0.70 to 0.80.

3. The ethylene-α-olefin copolymer according to claim 1, wherein the light scattering area ratio is 2.70 to 3.00.

4. The ethylene-α-olefin copolymer according to claim 1, wherein when a total mass of the ethylene-α-olefin copolymer is 100% by mass, a content of the monomer unit (1) is 90% by mass or more, and a content of the monomer unit (2) is 10% by mass or less.

5. The ethylene-α-olefin copolymer according to claim 1, wherein the monomer unit (2) is a monomer unit based on an α-olefin having 4 to 8 carbon atoms.

6. The ethylene-α-olefin copolymer according to claim 1, wherein a melt flow rate measured under conditions of a temperature of 190° C. and a load of 21.18 N is 0.010 g/10 min to 0.2 g/10 min.

7. The ethylene-α-olefin copolymer according to claim 1, wherein a density is 910 kg/m$^3$ to 940 kg/m$^3$.

8. An ethylene-based resin composition comprising:
the ethylene-α-olefin copolymer according to claim 1; and
an ethylene-based polymer having a monomer unit based on ethylene (different from the ethylene-α-olefin copolymer).

9. The ethylene-based resin composition according to claim 8, wherein a melt flow rate of the ethylene-based polymer measured under conditions of a temperature of 190° C. and a load of 21.18 N is 0.01 g/10 min to 5 g/10 min, and a density of the ethylene-based polymer is 910 kg/m$^3$ to 940 kg/m$^3$.

10. The ethylene-based resin composition according to claim 8, wherein a content of the ethylene-α-olefin copolymer is 1% by mass to 30% by mass with respect to a total content of 100% by mass of the ethylene-α-olefin copolymer and the ethylene-based polymer.

11. A film comprising the ethylene-α-olefin copolymer according to claim 1.

12. A film comprising the ethylene-α-olefin copolymer according to claim 8.

* * * * *